(12) United States Patent
Bao et al.

(10) Patent No.: US 11,595,938 B2
(45) Date of Patent: Feb. 28, 2023

(54) POSITIONING BASED ON RELATIVE POSITIONS OF BASE STATIONS AND/OR USER EQUIPMENTS

(71) Applicant: QUALCOMM Incorporated, San Diego, CA (US)

(72) Inventors: Jingchao Bao, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/164,466

(22) Filed: Feb. 1, 2021

(65) Prior Publication Data
US 2022/0248366 A1    Aug. 4, 2022

(51) Int. Cl.
*H04W 64/00*      (2009.01)
*H04W 24/10*      (2009.01)
*H04W 92/18*      (2009.01)

(52) U.S. Cl.
CPC ......... *H04W 64/006* (2013.01); *H04W 24/10* (2013.01); *H04W 92/18* (2013.01)

(58) Field of Classification Search
None
See application file for complete search history.

(56) References Cited

U.S. PATENT DOCUMENTS

| 11,240,776 B2 | 2/2022 | Gunnarsson et al. |
| 2018/0217224 A1* | 8/2018 | Jain ............... G01S 5/0221 |
| 2020/0296680 A1 | 9/2020 | Akkarakaran et al. |
| 2022/0038943 A1* | 2/2022 | Hu .................. H04L 43/06 |

FOREIGN PATENT DOCUMENTS

| WO | WO-2020229972 A1 | 11/2020 |
| WO | WO-2021232228 | 11/2021 |
| WO | WO-2022010910 | 1/2022 |

OTHER PUBLICATIONS

International Search Report and Written Opinion—PCT/US2021/061012—ISA/EPO—dated Mar. 10, 2022.

* cited by examiner

*Primary Examiner* — Adolf Dsouza
(74) *Attorney, Agent, or Firm* — Thien T. Nguyen

(57) ABSTRACT

A user equipment (UE) receives assistance data for positioning that includes relative position information for anchor points, such as base stations and/or sidelink UEs. The relative position information may include, for example, distances or angles between anchor points. The UE performs positioning measurements for reference signals received from the anchor points. The UE performs outlier rejection of the positioning measurements using the relative position information. Positioning measurements selected by the UE using the relative position information are provided to a location server. The location server may perform UE-assisted positioning using the selected position measurements and the actual locations of the anchor points. Accordingly, the outlier rejection of the position measurements may be off loaded from the location server to the UE while maintaining confidentiality of the actual locations of the anchor points.

32 Claims, 8 Drawing Sheets

400 ⟶

402 ⟶

|  | BS1 | BS2 | BS3 | BS4 | BS5 | BS6 | BS7 | BS8 | SL-UE | UE |
|---|---|---|---|---|---|---|---|---|---|---|
| BS1 | 0 | 54 | 121 | 70 | 193 | 60 | 74 | 213 | 215 | 54 |
| BS2 | 54 | 0 | 92 | 94 | 174 | 123 | 71 | 185 | 171 | 59 |
| BS3 | 121 | 92 | 0 | 87 | 83 | 172 | 161 | 94 | 102 | `40 |
| BS4 | 70 | 94 | 87 | 0 | 117 | 96 | 142 | 164 | 159 | 222 |
| BS5 | 193 | 174 | 83 | 117 | 0 | 233 | 245 | 34 | 95 | 230 |
| BS6 | 60 | 123 | 172 | 96 | 233 | 0 | 109 | 254 | 275 | 92 |
| BS7 | 74 | 71 | 161 | 142 | 245 | 109 | 0 | 257 | 240 | 28 |
| BS8 | 213 | 185 | 94 | 164 | 34 | 254 | 257 | 0 | 67 | 244 |
| SL-UE | 215 | 171 | 102 | 159 | 95 | 275 | 240 | 67 | 0 | 244 |
| UE | 54 | 59 | `40 | 222 | 230 | 92 | 28 | 244 | 244 | 0 |

FIG. 4

POSITIONING BASED ON RELATIVE POSITIONS OF BASE STATIONS AND/OR USER EQUIPMENTS

BACKGROUND

Field

The subject matter disclosed herein relates to wireless communications systems, and more particularly to systems, methods, and devices that support positioning of a user equipment (UE) using relative positions of anchor points, such as base stations and other UEs.

Relevant Background

Wireless communication systems are widely deployed to provide various telecommunication services such as telephony, video, data, messaging, positioning, and broadcasts. Typical wireless communication systems may employ multiple-access technologies capable of supporting communication with multiple users by sharing available system resources (e.g., bandwidth, transmit power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit). Additionally, UEs may communicate directly with each other using sidelink channels.

The location of UE may be useful or essential to a number of applications including emergency calls, navigation, direction finding, asset tracking and Internet service. The location of a UE may be estimated based on information gathered from various systems. In a cellular network implemented according to LTE or 5G NR, for example, a base station may send downlink reference signals with which positioning measurements are performed by a UE and/or the UE may send uplink reference signals with which positioning measurements are performed by the base stations. Additionally, sidelink reference signals may be transmitted by UEs and positioning measurements performed by a UE. The UE may receive the locations of base stations in assistance data and compute an estimate of its own location using the positioning measurements in UE-based positioning and positions of the base stations in UE-based positioning. Alternatively, the UE may send the positioning measurements to a network entity, e.g., location server, which may compute the UE location based on the positioning measurements and known positions of the base stations in UE-assisted positioning. It may be desirable for positioning improvements that may improve accuracy without increasing complexity.

SUMMARY

A user equipment (UE) receives assistance data for positioning that includes relative position information for anchor points, such as base stations and/or sidelink UEs. The relative position information may include, for example, distances or angles between anchor points. The UE performs positioning measurements for reference signals received from the anchor points. The UE performs outlier rejection of the positioning measurements using the relative position information. Positioning measurements selected by the UE using the relative position information are provided to a location server. The location server may perform UE-assisted positioning using the selected position measurements and the actual locations of the anchor points. Accordingly, the outlier rejection of the position measurements may be off loaded from the location server to the UE while maintaining confidentiality of the actual locations of the anchor points.

In one implementation, a method for supporting positioning of a user equipment (UE) performed by the UE, includes receiving from a location server assistance data comprising relative position information for base stations; receiving reference signals from the base stations; performing positioning measurements of the reference signals received from the base stations; and sending to the location server for UE assisted positioning at least a portion of the positioning measurements based on the assistance data.

In one implementation, a user equipment (UE) configured for supporting positioning of the UE, includes a wireless transceiver configured to wirelessly communicate with entities in a wireless network; at least one memory; at least one processor coupled to the wireless transceiver and the at least one memory, wherein the at least one processor is configured to: receive from a location server assistance data comprising relative position information for base stations; receive reference signals from the base stations; perform positioning measurements of the reference signals received from the base stations; and send to the location server for UE assisted positioning at least a portion of the positioning measurements based on the assistance data.

In one implementation, a user equipment (UE) configured for supporting positioning of the UE, includes means for receiving from a location server assistance data comprising relative position information for base stations; means for receiving reference signals from the base stations; means for performing positioning measurements of the reference signals received from the base stations; and means for sending to the location server for UE assisted positioning at least a portion of the positioning measurements based on the assistance data.

In one implementation, a non-transitory storage medium including program code stored thereon, the program code is operable to configure at least one processor in a user equipment (UE) for supporting positioning of the UE, includes program code to receive from a location server assistance data comprising relative position information for base stations; program code to receive reference signals from the base stations; program code to perform positioning measurements of the reference signals received from the base stations; and program code to send to the location server for UE assisted positioning at least a portion of the positioning measurements based on the assistance data.

In one implementation, a method for supporting positioning of a user equipment (UE) performed by a location server, includes sending to the UE assistance data comprising relative position information for base stations; receiving from the UE positioning measurements of reference signals from the base stations that are received and measured by the UE; and performing UE assisted position determination to determine a position of the UE using the positioning measurements received from the UE.

In one implementation, a location server configured for supporting positioning of a user equipment (UE), includes an external interface configured to communicate with entities in a wireless network; at least one memory; at least one processor coupled to the external interface and the at least one memory, wherein the at least one processor is configured to: send to the UE assistance data comprising relative position information for base stations; receive from the UE positioning measurements of reference signals from the base stations that are received and measured by the UE; and perform UE assisted position determination to determine a position of the UE using the positioning measurements received from the UE.

In one implementation, a location server configured for supporting positioning of a user equipment (UE), includes means for sending to the UE assistance data comprising relative position information for base stations; means for receiving from the UE positioning measurements of reference signals from the base stations that are received and measured by the UE; and means for performing UE assisted position determination to determine a position of the UE using the positioning measurements received from the UE.

In one implementation, a non-transitory storage medium including program code stored thereon, the program code is operable to configure at least one processor in a location server for supporting positioning of a user equipment (UE), includes program code to send to the UE assistance data comprising relative position information for base stations; program code to receive from the UE positioning measurements of reference signals from the base stations that are received and measured by the UE; and program code to perform UE assisted position determination to determine a position of the UE using the positioning measurements received from the UE.

BRIEF DESCRIPTION OF THE DRAWINGS

FIG. 4 illustrates an example of a matrix that may be generated for outlier rejection of positioning measurements.

Figure 1:
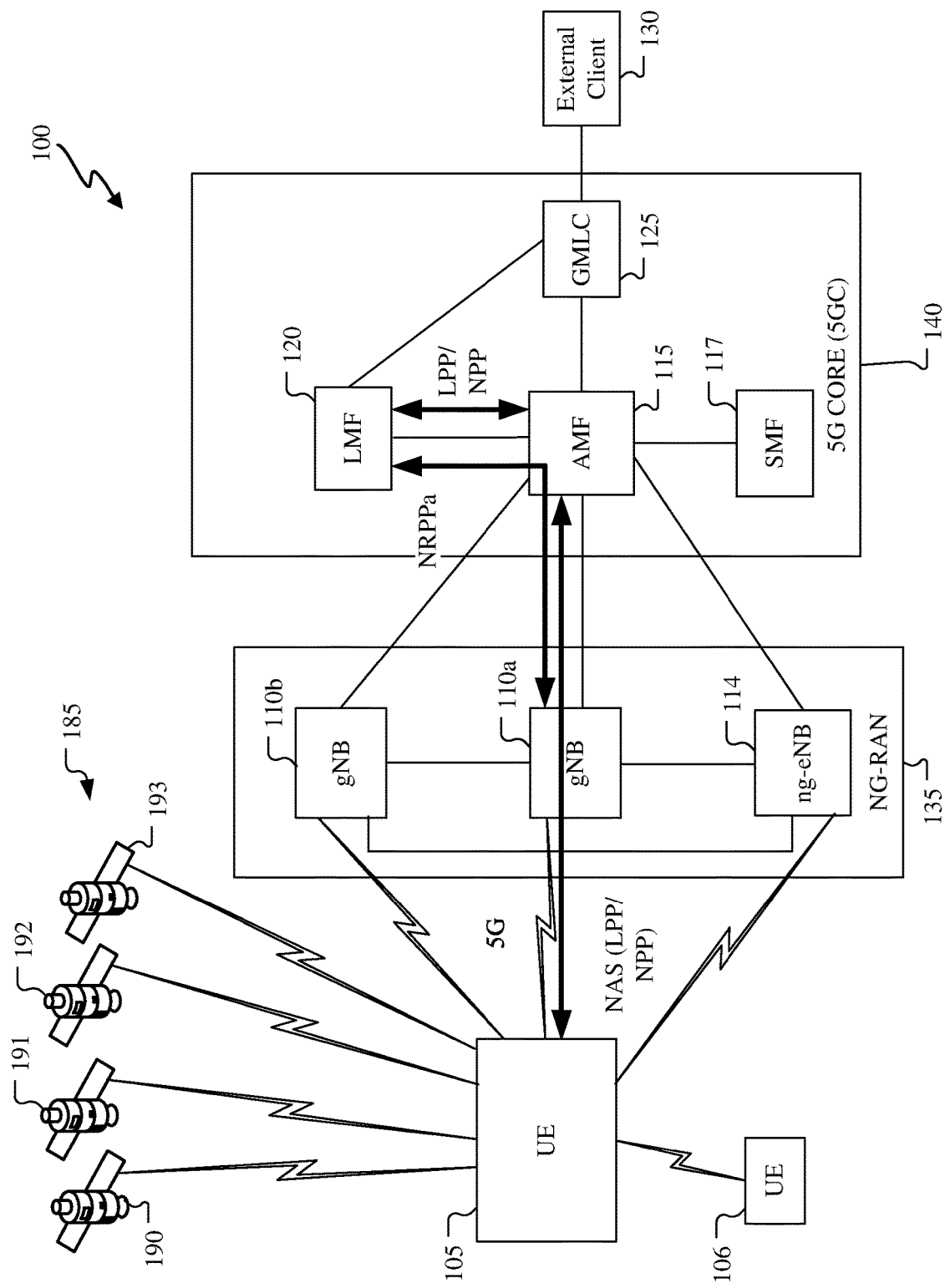
FIG. 1 shows an architecture of communication system including a target UE, an anchor UE, a Radio Access Network (RAN), and a 5G Core Network (5GC).

Elements are indicated by numeric labels in the figures with like numbered elements in different figures representing the same element or similar elements. Different instances of a common element are indicated by following a numeric label for the common element with a distinct numeric suffix. In this case, a reference to the numeric label without a suffix indicates any instance of the common element.

DETAILED DESCRIPTION

Techniques are discussed herein for performing UE-assisted positioning in which the set of positioning measurements provided by the UE to the network entity, e.g., location server, may be reduced based on the geometric relationships, e.g., relative position information, between network nodes.

The position calculation for the UE, for example, relies on the geometric relationships between the measured quantities and the positions of the nodes exchanging the signals being measured. Non-line of sight (NLOS) propagation, however, distorts the geometric relationships of the measured quantities. For example, the measured round trip time (RTT) between two nodes is assumed to indicate the distance between the nodes, but this is only true if the signal follows the line-of-sight path between the nodes, otherwise the RTT overestimates the distance.

Outlier rejection schemes, such as random sample consensus (RANSAC) and receiver autonomous integrity monitoring (RAIM) may be used to identify and reject bad measurements, e.g., measurements affected by NLOS propagation. Outlier rejection schemes may, in generally, compute a UE position using various subsets of positioning measurements, and determine whether the resulting positions are consistent across all sets of positioning measurements, including remaining unused measurements. A subset of positioning measurements that provides consistent positions may be selected, which effectively rejects outlier measurements. The selection process based on such outlier rejection schemes improves accuracy, but increases the complexity of position determination, as the position is repeatedly calculated using multiple subsets of positioning measurements. Moreover, the increase in complexity may have a greater impact at the location server, e.g., for UE-assisted positioning, than at the UE for UE-based positioning. For example, the location server may be required to estimate the location of multiple UEs, whereas a UE is only required to estimate the location for itself. Thus, for example, if a location server can support 1000 location estimations per second, and if outlier rejection requires 100 trials before reaching a final estimation, then the location server can support only 10 UEs in a second. On the other hand, if each UE can perform the 100 trials for outlier rejection for itself, then the location server may support 1000 UEs per second.

The complexity considerations motivate a preference for UE-based positioning over UE-assisted positioning. However, UE-assisted positioning is often preferable for various reasons, such as where locations of the base stations is considered sensitive or proprietary information, and the operate does not wish to provide base station position information to UEs in assistance data, which is required for UE-based positioning.

Accordingly, as discussed herein, UE-assisted positioning is performed in which the set of positioning measurements provided by the UE to the network entity, e.g., location server, is reduced based on the geometric relationships, e.g., relative position information, between the network nodes. For example, assistance data may be provided to the UE that includes relative position information, e.g., relative distances and/or relative angles between base stations, and the UE may perform outlier rejection using the relative position information and provide the selected set of positioning measurements to the location server for position determination. Thus, the UE performs the outlier rejection in order to avoid the high complexity of outlier rejection at the location server, while the location server performs the position determination for the UE in UE-assisted positioning.

Items and/or techniques described herein may provide one or more of the following capabilities, as well as other capabilities not mentioned. Positioning of a target UE may be achieved in the absence of sufficient base stations for positioning of the target UE. Positioning accuracy of a target UE may be improved. Communication from a target UE may be improved, e.g., by using an anchor UE as a communication relay. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

FIG. 1 shows an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110*a*, 110*b*, and the ng-eNB 114 may be referred to as base stations (BSs). The AMF 115, the SMF 117, the LMF 120, and the GMLC 125 are communicatively coupled to each other, and the GMLC 125 is communicatively coupled to an external client 130. The SMF 117 may serve as an initial contact point of a Service Control Function (SCF) (not shown) to create, control, and delete media sessions. The BSs 110*a*, 110*b*, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110*a*, 110*b*, 114 may be configured to communicate with the UEs 105 via multiple carriers. Each of the BSs 110*a*, 110*b*, 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted, as necessary. Specifically, although only UEs 105 and 106 are illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UE 105 or at BSs 110*a*, 110*b*, 114 and/or provide location assistance to UE 105 (via the GMLC 125 or other location server) and/or compute a location for UE 105 at a location-capable device such as UE 105, the BSs 110*a*, 110*b*, or the LMF 120 based on measurement quantities received at UE 105 or the BSs 110*a*, 110*b*, 114 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality, respectively.

The system 100 is capable of wireless communication in that components of the system 100 can communicate with one another (at least sometimes using wireless connections) directly or indirectly, e.g., via the BSs 110*a*, 110*b*, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses, or headsets, etc.). Still other UEs may be used, whether currently existing or developed in the future. Further, other wireless devices (whether mobile or not) may be implemented within the system 100 and may communicate with each other and/or with the UE 105, the BSs 110*a*, 110*b*, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UE 105 may communicate with other UEs, e.g., UE 106, through UE-to-UE sidelink (SL) communications by transmitting over one or more sidelink channels, such as a physical sidelink synchronization channel (PSSCH), a physical sidelink broadcast channel (PSBCH), a physical sidelink control channel (PSCCH), sidelink channel state information reference signal (SL-CSIRS), physical sidelink feedback channel (PSFCH), or sidelink sounding reference signals (SL-SRS).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of UE 105 may be referred to as a location, location estimate, location fix, fix, position, position estimate, or position fix, and may be geographic, thus providing location coordinates for the UE (e.g., latitude and longitude) which may or may not include an altitude component (e.g., height above sea level, height above or depth below ground level, floor level, or basement level). Alternatively, a location of UE 105 may be expressed as a civic location (e.g., as a postal address or the designation of some point or small area in a building such as a particular room or floor). A location of UE 105 may be expressed as an area or volume (defined either geographically or in civic form) within which UE 105 is expected to be located with some probability or confidence level (e.g., 67%, 95%, etc.). A location of UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to UE 105 via wireless communication between the UEs and one or more of the gNBs 110a, 110b, which may provide wireless communications access to the 5GC 140 on behalf of the UE using 5G. In FIG. 1, the serving gNB for the UE is assumed to be the gNB 110a, although another gNB may act as a serving gNB if the UE 105 moves to another location or may act as a secondary gNB to provide additional throughput and bandwidth to UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to UE 105. One or more of the gNBs 110a, 110b and/or the ng-eNB 114 may be configured to function as positioning-only beacons which may transmit signals to assist with determining the position of UE 105 but may not receive signals from UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Communications system 100 may support NR and support communications between the one or more base stations 110a, 110b, 114 and supported UEs. The UEs may be dispersed throughout the wireless communications system 100, and each UE may be stationary or mobile. As part of the communication, each of the base stations 110a, 110b, 114 and UE 105 may support reference signal transmission for operations, including channel estimation, beam management and scheduling, and wireless device positioning within the coverage areas of one or more base stations.

For example, the base stations 110a, 110b, 114 may transmit one or more downlink reference signals for NR communications, including channel state information reference signal (CSI-RS) transmission. Each of the CSI-RS transmissions may be configured for a specific UE to estimate the channel and report channel quality information. The reported channel quality information may be used for scheduling or link adaptation at the base stations 110a, 110b, 114 or as part of a mobility or beam management procedure for directional transmission associated with the enhanced channel resources. Similarly, the UE 105 may be configured to transmit uplink signals to one or more base stations 110a, 110b, 114 and sidelink transmissions between UEs 105 and 106.

The base stations 110a, 110b, 114 may transmit one or more additional downlink reference signals, including a positioning reference signal (PRS) transmission. The PRS transmission may be configured for a specific UE to measure and report one or more report parameters (for example, report quantities) associated with positioning and location information. The PRS transmission and report parameter feedback may support various location services (for example, navigation systems and emergency communications). In some examples, the report parameters supplement one or more additional location systems supported by the UE 105 (such as global positioning system (GPS) technology).

A base station 110a, 110b, 114 may configure a PRS transmission on one or more PRS resources of a channel. A PRS resource may span resource elements of multiple physical resource blocks (PRBs) within one or more OFDM symbols of a slot depending on a configured number of ports. For example, a PRS resource may span one symbol of a slot and contain one port for transmission. In any OFDM symbol, the PRS resources may occupy consecutive PRBs. In some examples, the PRS transmission may be mapped to consecutive OFDM symbols of the slot. In other examples, the PRS transmission may be mapped to interspersed OFDM symbols of the slot. Additionally, the PRS transmission may support frequency hopping within PRBs of the channel.

The one or more PRS resources may span a number of PRS resource sets according to a PRS resource setting of the base station 110a, 110b, 114. The structure of the one or more PRS resources, PRS resource sets, and PRS resource settings within a PRS transmission may be referred to as a multi-level resource setting. For example, multi-level PRS resource setting of the base station 110a, 110b, 114 may include multiple PRS resource sets and each PRS resource set may contain a set of PRS resources (such as a set of 4 PRS resources).

The UE 105 may receive the PRS transmission over the one or more PRS resources of the slot. The UE 105 may determine a report parameter for at least some of if not each PRS resource included in the transmission. The report parameter (which may include a report quantity) for each PRS resource may include one or more of a time of arrival (TOA), a reference signal time difference (RSTD), a reference signal receive power (RSRP), an angle, a PRS identification number, a reception to transmission difference (UE Rx-Tx), a signal-to-noise ratio (SNR), or a reference signal receive quality (RSRQ).

Similarly, the UE 105 may be configured to transmit one or more additional uplink reference signals that may be received by base stations 110a, 110b, 114 and used for positioning. For example, UE 105 may transmit sounding reference signal (SRS) for positioning. Base stations 110a, 110b, 114 that receive uplink reference signals from a UE 105 may perform positioning measurements, such as one or more of a time of arrival (TOA), reception to transmission difference (UE Rx-Tx).

Aspects of wireless communications system 100 may include use of downlink PRS transmissions by the base station 110a, 110b, 114 or uplink SRS transmissions by a UE, e.g., UE 105, for UE location determination. For downlink-based UE location determination, a location server, e.g., LMF 120 in a NR network, or E-SMLC in LTE (sometimes referred to as location server 120), may be used to provide positioning assistance, such as PRS assistance data (AD) to the UE. In UE-assisted positioning, the location server may receive measurement reports from the UE that indicates position measurements for one or multiple base stations 110a, 110b, 114 with which location server may determine a position estimate for the UE, e.g., using TDOA, or other desired techniques. The location server 120 is illustrated in FIG. 1 as being located in the core networks 140, but may be external to the core networks 140, e.g., in an NG-RAN.

A position estimation of the UE may be determined using reference signals, such as PRS signals or SRS for positioning signals, or other reference signals, from one or more base stations 110a, 110b, 114 or the UE. Positioning methods, such as Time Difference of Arrival (TDOA), DL Time Difference of Arrival (DL-TDOA), DL Angle of Departure (DL AoD), Enhanced Cell ID (ECID) are position methods that may be used to estimate the position of the UE using reference signals from base stations. TDOA, for example, relies on measuring Reference Signal Time Differences (RSTDs) between downlink (DL) signals received from a base station for a reference cell and base station(s) for one or more neighbor cells. The DL signals for which RTSDs may be obtained comprise a Cell-specific Reference Signal (CRS) and a Positioning Reference Signal (PRS)—e.g., as defined in 3GPP TS 36.211.

Other positioning methods may use reference signals transmitted by the UE including uplink based positioning methods and downlink and uplink based positioning methods. For example, uplink based positioning methods include, e.g., UL Time Difference of Arrival (UL-TDOA), UL Angle of Arrival (UL AoA), UL Relative Time of Arrival (UL-RTOA) and downlink and uplink based positioning methods, e.g., Round-trip time (RTT) with one or more neighboring base stations. Additionally, sidelink based positioning may be used, e.g., in which UEs transmit and/or receive sidelink positioning reference signals that are measured and used for positioning.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs).

A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to UE 105 and possibly data and voice bearers for UE 105. The LMF 120 may communicate directly with UE 105, e.g., through wireless communications, or directly with the BSs 110a, 110b, 114. The LMF 120 may support positioning of UE 105 when UE 105 accesses the NG-RAN 135 and may support position procedures/methods such as Assisted GNSS (A-GNSS), Time Difference of Arrival (TDOA) (e.g., Downlink (DL) TDOA or Uplink (UL) TDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE) may be performed at the UE (e.g., using signal measurements obtained by the UE for signals transmitted by wireless nodes such as the gNBs 110a, 110b and/or the ng-eNB 114, and/or assistance data provided to the UE, e.g., by the LMF 120). At least part of the positioning functionality (including derivation of the location of the UE) alternatively may be performed at the LMF 120 (e.g., using signal measurements obtained by the gNBs 110a, 110b and/or the ng-eNB 114. The AMF 115 may serve as a control node that processes signaling between UE 105 and the core network 140 and provides QoS (Quality of Service) flow and session management. The AMF 115 may support mobility of UE 105 including cell change and handover and may participate in supporting signaling connection to UE 105.

The GMLC 125 may support a location request for UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and UE 105 may communicate using an LTE Positioning Protocol (LPP), which may be defined in 3GPP TS 36.355. The LMF 120 and UE 105 may also or instead communicate using a New Radio Positioning Protocol (which may be referred to as NPP or NRPP), which may be the same as, similar to, or an extension of LPP. Here, LPP and/or NPP messages may be transferred between UE 105 and the LMF 120 via the AMF 115 and the serving gNB 110a, 110b or the serving ng-eNB 114 for UE 105. For example, LPP and/or NPP messages may be transferred between the LMF 120 and the AMF 115 using a 5G Location Services Application Protocol (LCS AP) and may be transferred between the AMF 115 and UE 105 using a 5G Non-Access Stratum (NAS) protocol. The LPP and/or NPP protocol may be used to support positioning of UE 105 using UE-assisted and/or UE-based position methods such as A-GNSS, RTK, TDOA, AOA, AOD, and/or E-CID. The NRPPa protocol may be used to support positioning of UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional Synchronization Signal (SS) transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

An LPP or NPP message sent from the LMF 120 to UE 105 may instruct UE 105 to do any of a variety of things depending on desired functionality. For example, the LPP or NPP message could contain an instruction for UE 105 to obtain measurements for GNSS (or A-GNSS), WLAN, E-CID, and/or TDOA (or some other position method). In the case of E-CID, the LPP or NPP message may instruct UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of UE 105. In these other embodiments, positioning of UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

With a UE-assisted position method, UE 105 may obtain location measurements and send the measurements to a location server (e.g., the LMF 120) for computation of a location estimate for the UE. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ), AOA, AOD, for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, UE 105 may obtain location measurements (e.g., which may be the same as or similar to location measurements for a UE-assisted position method) and may compute a location of the UE (e.g., with the help of assistance data that includes positions of base stations received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114), sidelink UEs, or APs may obtain location measurements (e.g., measurements of RSSI, RTT, RSRP, RSRQ, AOA, AOD, or Time of Arrival (ToA) for signals transmitted by UE 105 and/or may receive measurements obtained by the UE. The one or more base stations or APs may send the measurements to a location server (e.g., the LMF 120) for computation of a location estimate for the UE.

Information provided by the gNBs 110a, 110b, and/or the ng-eNB 114 to the LMF 120 using NRPPa may include timing and configuration information for directional SS transmissions and location coordinates. The LMF 120 may provide some or all of this information to UE 105 as assistance data in an LPP and/or NPP message via the NG-RAN 135 and the 5GC 140. The UE 105 may similarly receive assistance data for sidelink UEs from the LMF 120 or directly from the sidelink UEs. The UE 105 may use the configuration information for the various nodes used for positioning, e.g., gNBs 110a, 110b, and/or the ng-eNB 114 and SL UE 106, which is sometimes referred to as anchor points, to receive and measure downlink and sidelink reference signals for positioning. The positioning measurements may be used, along with the absolute locations of the anchor points to calculate the position of the UE by the position calculating node, e.g., the LMF 120 in a UE-assisted positioning or by the UE in UE-based positioning. For example, the LMF 120 may provide the absolute location information of base stations and/or the sidelink UEs to the UE 105 in assistance data. In some implementations, the sidelink UEs may provide configuration information and/or absolute location information to the UE 105 in a sidelink connection. The UE 105 may use the absolute location information for the anchor points with the positioning measurements to calculate the position of the UE 105 for UE-based positioning. In a UE-assisted positioning implementation, the UE 105 provides the positioning measurements to the LMF 120, e.g., in a position information report, and the LMF 120 calculates the position of the UE 105, and thus, the absolute location information of the anchor points need not be provided to the UE 105.

However, even if the absolute locations of the anchor points are not known, the position of the UE 105 relative to the anchor points, e.g., the base stations and/or sidelink UEs, may still be calculated as a relative position. The relative position calculation still requires position information for the anchor points, but in lieu of the absolute positions of the anchor points, the relative position calculation may use relative position information for the anchor points. The relative position information, for example, may be, e.g., relative distances and/or relative angles, between the anchor points, e.g., the base stations and/or sidelink UEs, or signal strength measurements from sidelink UEs to other anchor points.

The LMF 120, for example, may provide the relative position information of the anchor points to the UE 105 in assistance data. With respect to sidelink UEs, the LMF 120 may have knowledge of the positions of the base stations and the position of the sidelink UE used as an anchor point. Accordingly, the LMF 120 may determine the relative position information of the sidelink UEs with respect to other anchor points and provide this information to the UE 105 in assistance data. In some implementations, the sidelink UEs may determine the relative position information with respect to other anchor points and provide this information to the UE 105. For example, the relative distance between a sidelink UE and base station may be determined based on measurements (e.g., RTT) or calculated based on the sidelink UE's estimated location and the anchor point location. The relative position information may be used by the UE 105 for a relative position calculation of the UE and/or to perform outlier rejection of the positioning measurements, and to select a subset of positioning measurements to send to the LMF 120 for UE-assisted positioning process. In some implementations, the LMF 120 may include an artificial uncertainty or artificial noise in the relative position information of the anchor points, e.g., to obfuscate the actual locations of anchor points if that is considered proprietary or confidential information.

Figure 2:
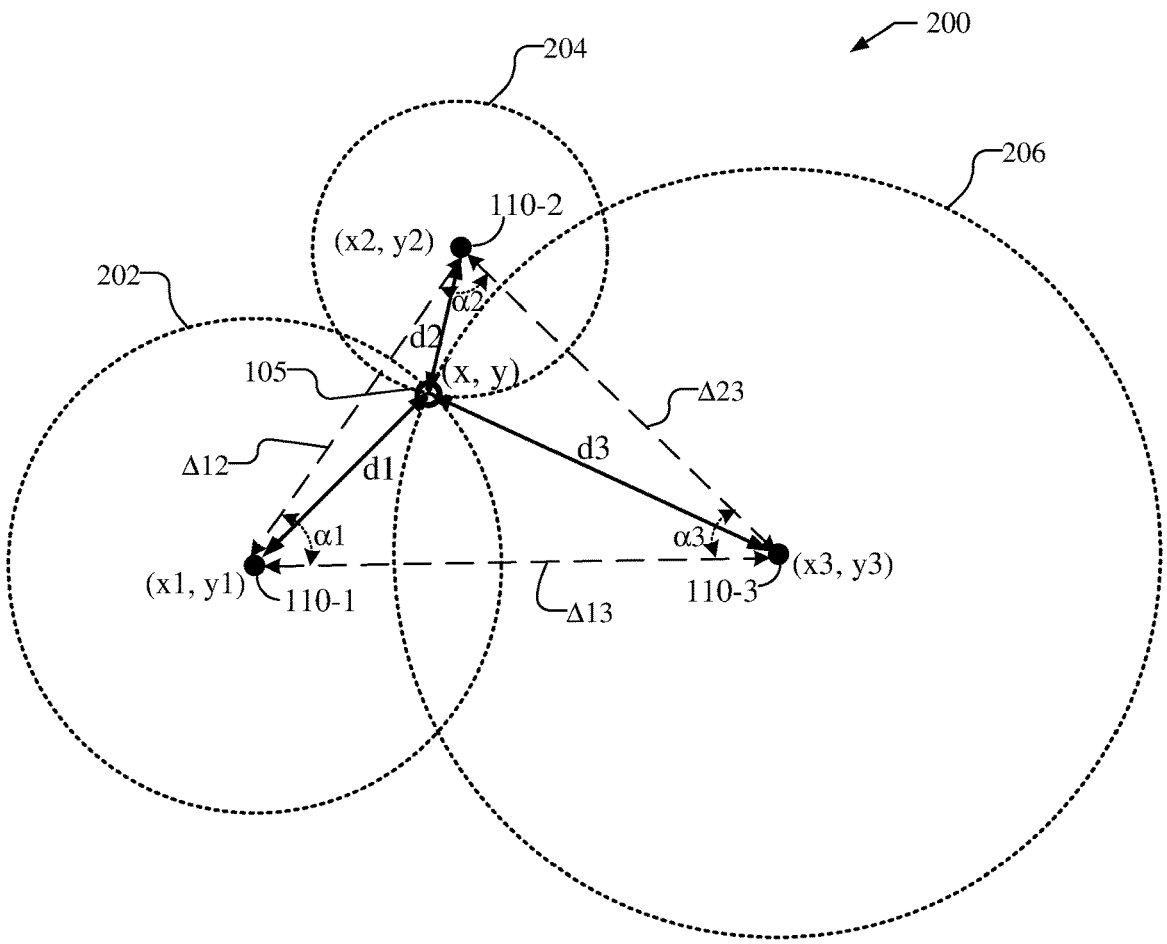
FIG. 2 illustrates a simplified environment and an exemplary technique for determining a position of a UE using multi-cell round trip time (multi RTT).

FIG. 2, by way of example, illustrates a simplified environment and an exemplary technique for determining a position of a UE 105 using multi-RTT. The position of UE 105 may be represented in 2 dimensions by Cartesian coordinates (x, y). RTT measurements may be obtained for three or more anchor points or nodes, illustrated as gNBs, 110-1, 110-2 and 110-3, with coordinates (xk, yk), where k=1, 2, 3. The UE 105 or a separate location server (e.g., LMF 120) may determine a distance dk, where k=1, 2, 3, to each of the three gNBs 110-k. The distance dk to each gNB 110-k is given by:

$$dk = RTTk * c/2 \qquad \text{(Eq. 1)}$$

where RTTk is the measured RTT for gNB 110-k and c is the signal speed (e.g., speed of light).

Once each distance dk is determined, the UE 105 or the location server 120 can solve for the actual position (x, y) of the UE 105 using a variety of known geometric techniques, such as, for example, trilateration, based on the known absolute locations of the gNBs 110-*k*. From FIG. 2, it can be seen that the position of the UE 105 ideally lies at the common intersection of all of the circles 202, 204, and 206 drawn using dotted lines. Each circle is defined by a radius dk and center (xk, yk), where k=1, 2, 3. In practice, the intersection of these circles may not lie at a single point due to noise and other errors in obtaining RTT measurements. The method, as illustrated in FIG. 2, can be extended to a greater number of gNBs 110 and may be used to determine a three-dimensional location of UE 105 (e.g., from the common intersection point of spheres centered on each of the gNBs 110) if the gNBs 110 are at different heights. Such extensions are commonly known to those versed in the art.

By way of example, with knowledge of the relative position information for the gNBs 110, e.g., the relative distances Δ12, Δ13, and Δ23 or the angles α1, α2, and α3, the relative position of the UE 105 may be determined, i.e., the position of the UE 105 relative to the gNBs 110, using known geometric techniques, such as, for example, multi-lateration. For the relative position calculation, the absolution positions of the gNBs 110-*k*, e.g., (xk, yk), where k=1, 2, 3, is not needed. The determination of the relative position for the UE, however, may not be required. As discussed below, the relative information may be used for the outlier rejection, and the UE may then send then send the results (e.g., the measurements that pass the outlier rejection) to the positioning entity (e.g., location server 120, which then estimates the position.

Figure 3:
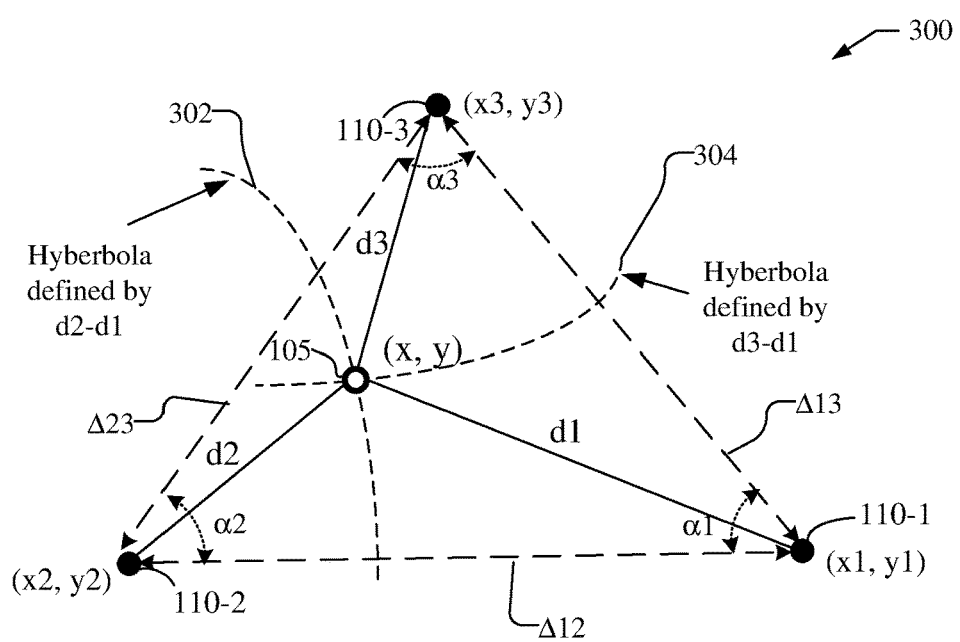
FIG. 3 illustrates a simplified environment and another exemplary technique for determining a position of a UE using Time of Arrival (TOA) measurements.

FIG. 3, by way of example, illustrates a simplified environment, similar to FIG. 2, and another exemplary technique for determining a position of a UE 105 using Time of Arrival (TOA) measurements for reference signals received from each of the three anchor points, illustrated as gNBs 110-*k* (for k=1, 2 and 3) relative to an internal time base of the UE 105. Between each pair of gNBs 110, the UE 105 measures the Reference Signal Time Difference (RSTD), which is the relative timing difference between a pair of gNBs, e.g., a reference gNB 110 (e.g., SgNB 110-1) and a measured gNB (e.g., gNB 110-2), which can be determined as the time difference between a subframe boundary received from the reference gNB 110 and the closest (next or preceding) subframe boundary received from the measured gNB 110. For example, an RSTD may be measured as the difference between the TOA of a reference signal from the reference gNB 110 and the TOA of a corresponding reference signal from the measured gNB 110.

As is well known in the art, a time difference of arrival (TDOA) may be determined as the time interval that is observed by UE 105 between the reception of a downlink (DL) reference signal (RS) from each of two different gNBs 110 and can correspond to an RSTD measurement. Assuming the gNBs are synchronized, if a DL RS from gNB 110-1 in FIG. 3 (e.g., indicating a subframe boundary) is received by UE 105 at a time t1, and a corresponding DL RS from gNB 110-2 that is closest in time to t1 is received by UE 105 at a time t2, the TDOA value is (t2−t1), placing the UE 105 on the hyperbola 302. A similar determination using DL RSs received from gNBs 110-1 and 110-3 in FIG. 3 (via a measurement of an RSTD or TDOA between gNBs 110-1 and 110-3 by UE 105) may similarly locate the UE 105 on a hyperbola 304. The intersection of the two hyperbolas may then locate the UE 105

Once the hyperbolas are determined, the UE 105 or the location server 120 can solve for the actual position (x, y) of the UE 105 using a variety of known geometric techniques, such as, for multilateration techniques, based on the known absolute locations (xk, yk) of the gNBs 110-*k*, where k=1, 2, 3.

By way of example, similar to the multi-RTT implementation discussed in FIG. 2, with knowledge of the relative position information for the gNBs 110, e.g., the relative distances Δ12, Δ13, and Δ23 or the angles α1, α2, and α3, the relative position of the UE 105 may be determined, i.e., the position of the UE 105 relative to the gNBs 110, using known geometric techniques, such as, for example, multi-lateration. For the relative position calculation, the absolution positions of the gNBs 110-*k*, e.g., (xk, yk), where k=1, 2, 3, is not needed. The determination of the relative position for the UE, however, may not be required. As discussed below, the relative information may be used for the outlier rejection, and the UE may then send then send the results (e.g., the measurements that pass the outlier rejection) to the positioning entity (e.g., location server 120, which then estimates the position.

Using relative location information received in assistance data from the LMF 120 and/or sidelink UEs, the UE 105 may perform the desired positioning measurements and perform outlier rejection of the positioning measurements. The UE 105 may report to the LMF 120 selected positioning measurements that are not rejected by the outlier rejection procedure. The outlier rejection performed by the UE 105 is based on the available relative position information for the anchor points, e.g., base stations and/or sidelink UEs, and the positioning measurements. The outlier rejection, for example, may be performed using, e.g., RANSAC or RAIM, or any other desired procedure to identify and reject inaccurate positioning measurements.

The relative position information for the inter-base station and the sidelink UEs in the assistance data may be provided with similar message formats. For example, relative position information for distances may be provided, e.g., as a list of triples: (node1-ID, node2-ID, distance), where the node ID may be a gNB PCellID, TRP-ID, PRS-ID, cell-global identifier, etc. The nodes may also be sidelink UEs, identified by any appropriate UE-ID (e.g., an International Mobile Subscriber Identifier (IMSI), International Mobile Equipment Identifier (IMEI), Permanent Equipment Identifier (PEI), sidelink server set identifier (SL-SS-ID), etc.). When the triples contain all pairwise distances between a set of nodes, a more compact reporting is possible. For example, a list of nodes may be provided, followed by a list of pairwise distances, e.g., in a pre-agreed or configured ordering, corresponding to the listed order of the nodes, such as: n1, n2, . . . nM, d(1,2), d(1,3), . . . d(1,M), d(2,3), d(2,4), . . . d(2,M), d(3,4), d(3,5), . . . d(3,M), . . . d(M−1,M), where n1, n2, . . . are the M node-IDs, and d(i,j) is the distance between node-i and node-j.

In another example, relative position information for angles may be provided. The angles may be reported as in Release 16 for 3GPP, using either geographic coordinate system (GCS) or local coordinate system (LCS), e.g., with azimuth and elevation in an East-North-Up frame. Alternatively, the angles may also be reported in a purely relative manner, such as tuples (n1, n2, n3, A) where A is the angle at node n2 between the segment joining n2 to n1 and the segment joining n2 to n3. When angles are reported for multiple triples among a set of nodes, a more compact reporting format is possible, similar to that described above for the distances, e.g., n1, n2, n3, . . . nM, A(1,2,3), A(2,3,4), A(3,4,5), . . . A(M−2, M−1,M) where A(i,j,k)=A in the tuple (i,j,k, A) defined above. If desired, other possible orderings may be defined for angles. The use of relative angles may serve to further hide the actual locations of base stations as compared to reporting in an East-North-Up frame, since it may leave a rotational ambiguity in addition to a translational ambiguity in the true locations, while conveying only the relative locations.

Additionally, the assistance data may further include an artificial uncertainty or noise to the relative distance and/or angle information. The use of artificial uncertainty or noise may further enhance the privacy of the actual location of the anchor points. The uncertainty may be a range, a distribution, etc.

Outlier rejection may be performed in any desired manner, including RANSAC or RAIM. For example, in one implementation, various subsets of positioning measurements and the relative position information for corresponding anchor points may be used to calculate a number of relative positions of the UE 105 to the corresponding anchor points. The calculated relative positions of the UE 105 to anchor points may be compared across different subsets of positioning measurements to identify consistent or inconsistent results. For example, inconsistent results indicate that one or more of the positioning measurements included in the subset of positioning measurements may be inaccurate. Subsets of positioning measurements that produce consistent relative position calculation results, e.g., consistent within a predetermined threshold, may be selected to provide to the LMF 120 and the remaining positioning measurements may be rejected as outliers.

In another implementation, the positioning measurements and the relative position information may be included in a matrix, and the rank of the matrix calculated to determine the dimension of the vector space generated (or spanned) by the columns in the matrix. The ranks of matrices of various subsets of positioning measurements and corresponding relative position information, thus, may be calculated, and subsets of positioning measurements that generate a desired matrix rank may be selected to provide to the location server 120 and the remaining positioning measurements rejected as outliers.

FIG. 4, by way of example, illustrates an example of a matrix 400 that may be generated for outlier rejection of positioning measurements. The matrix 400 includes relative position information for a number of anchor points, e.g., base stations (BS1-BS8) and a sidelink UE (SL-UE). The matrix 400 further includes the position measurement for the target UE relative to each anchor point in column 402. Matrix 400, for example, illustrates the relative position information and position measurements in terms of relative distances, but other relative position information may be used, such as relative angle measurements. In some implementation, signal strength measurements between the SL UE and the other anchor points received in assistance data may be converted to a relative distance measurement.

As is well known, the rank of a matrix is the dimension of the vector space generated (or spanned) by its columns, which corresponds to the maximal number of linearly independent columns of the matrix. Thus, the rank of matrix 400 may be calculated to determine whether all columns (or equivalently, all rows) are linearly independent. The relative position information for the anchor points, e.g., BS1-BS8, and SL-UE, may be assumed to be correct, but the position measurements generated by the target UE for the anchor points, shown along column 402, may be inaccurate due to various reasons, such as NLOS propagation. A lack of linear dependence in the matrix 400 is due to inaccurate position measurements produced by the target UE.

Accordingly, outlier rejection may be performed based on the determined ranks for a plurality of matrices formed using various subsets of the position measurements from the target UE and the relative position information for the corresponding anchor points. The rank of a matrix for each subset of position measurements may be determined and used to identify outlier positioning measurements. For example, a matrix with a determined rank that is greater than a desired rank, e.g., a rank of more than 3, may be identified as including positioning measurements that are linearly independent and, accordingly, inaccurate. On the other hand, a matrix with a determined rank that is the desired rank, e.g., a rank of 3 or less, may be identified as having positioning measurements that are suitably linearly dependent with the relative position information for the corresponding anchor points and, thus, may be selected as position measurements to be sent to the location server 120 for position determination. For three-dimensional positioning, for example, a rank of 3 is used, while for two-dimensional positioning a rank of 2 is used. It should be understood that all measurements have some error, which may be relatively small or large. The rank test, for example, may use a predetermined threshold, and if the fourth largest eigen value is smaller than the top three eigen values by the predetermined threshold, then the matrix may be considered a rank 3 matrix (for three-dimensional positioning), or if the third largest eigen value is smaller than the top two eigen values by the predetermined threshold, then the matrix may be considered a rank 2 matrix (for two-dimensional positioning). In some implementations, another rank test may additionally or alternative be used, e.g., where the ratio between the fourth largest and third largest eigen values is compared to a predetermined threshold and if smaller than the threshold, the matrix may be considered a rank 3 matrix (for three-dimensional positioning), or the ratio between the third largest and second largest eigen values is compared to the predetermined threshold and if smaller than the threshold, the matrix may be considered a rank 2 matrix (for two-dimensional positioning). The predetermined threshold may be empirically selected, e.g., based on measurement performance characteristics of the UE and desired performance of the outlier rejection.

Thus, by providing relative position information for anchor points to the UE 105, the UE 105 may perform outlier rejection of position measurements and provide only selected position measurements that were not rejected to a location server 120 for UE-assisted positioning. The outlier rejection is, advantageously, off loaded from the location server 120, without disclosing to the UE 105 confidential or proprietary position information for the anchor points.

As discussed above, in some implementations, the LMF 120 may include an artificial uncertainty or artificial noise in the relative position information of the anchor points in the assistance data, e.g., to obfuscate the actual locations of the anchor points. For example, it may be possible to "reverse-engineer" a precise base station location using the relative position information and position measurements from the UE 105, using additional side-information, such as an accurate position of the UE 105 determined from other sources, such as RAT-independent positioning, e.g., GNSS etc. The ability to determine the actual location of a base station may be undesirable if such information is considered proprietary and may defeat the purpose of preferring UE-assisted positioning to UE-based positioning. By including an artificial uncertainty or noise in the relative position information, e.g., as a range, a distribution, etc., the mapping between the actual location of a base station and the identity of the base station may be concealed. Where artificial uncertainty or noise is included in the relative position information, the thresholds used for outlier rejection may be suitable loosened, e.g., with an increase in the artificial uncertainty or noise in the relative position information, a corresponding increase in the matrix rank threshold may be used.

Figure 5:
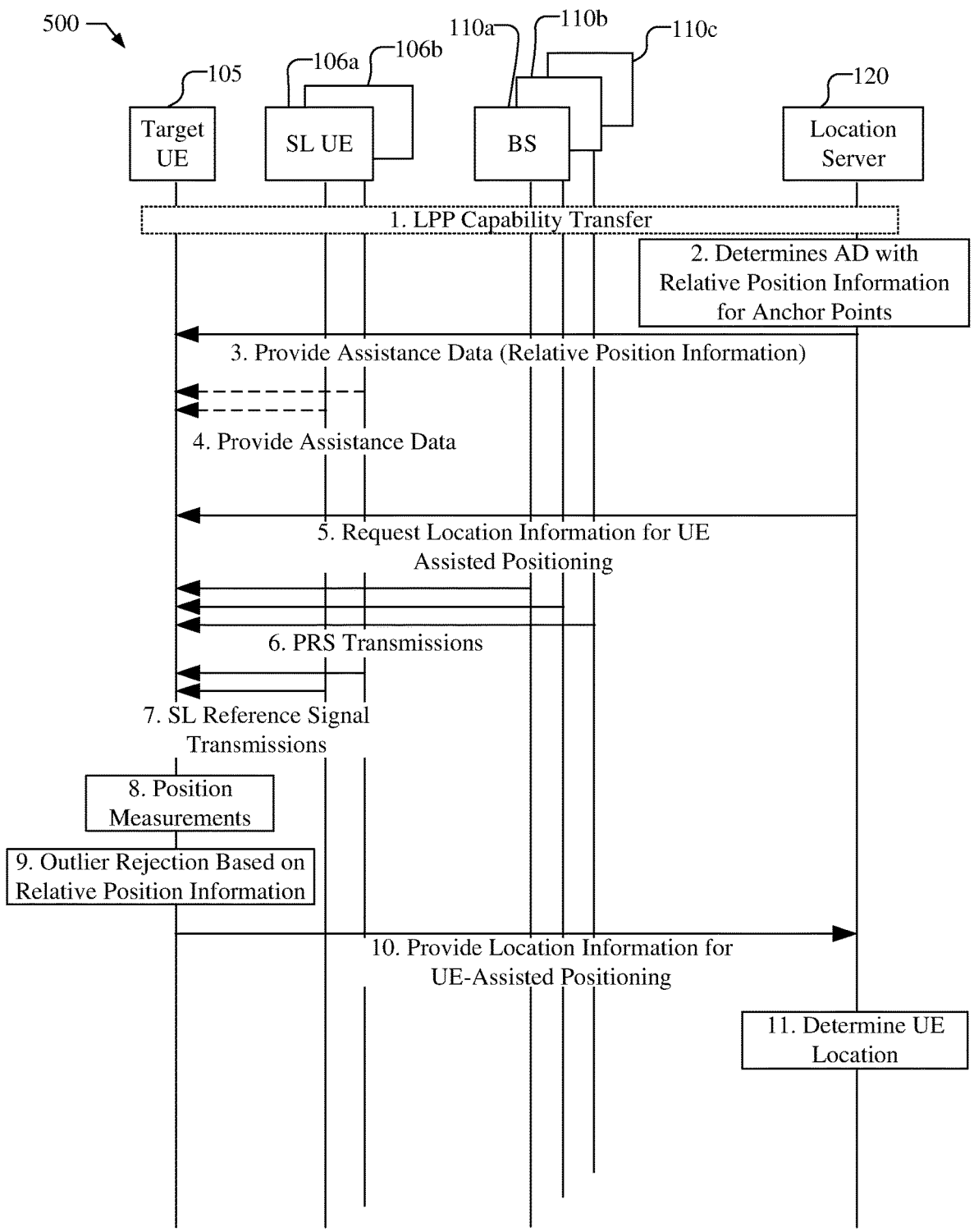
FIG. 5 is a signaling flow that illustrates various messages sent between components of the communication system during a location session using relative position information of the anchor points.

FIG. 5 is a signaling flow 500 that illustrates various messages sent between components of the communication system 100 depicted in FIG. 1, during a location session in which relative position information of the anchor points is provided in assistance data and used to select positioning measurements to provide to the location server 120 for UE-assisted positioning. The location server 120 may be, e.g., an LMF for a 5G NR network, or an E-SMLC in LTE. The target UE 105 may be configured to perform UE assisted positioning, in which the UE 105 performs positioning measurements of reference signals, such as DL PRS from a number of base stations, e.g., serving gNB1 110a, gNB2 110b, and gNB3 110c (sometimes collectively referred to as gNBs 110 or base stations 110), and SL-SRS for positioning from one or more sidelink UEs 106a and 106b (sometimes collectively referred to as SL UEs 106), and to provide the positioning measurements to the location server 120. As discussed above, the target UE 105 may be configured to perform outlier rejection of positioning measurements based on the relative position information of the anchor points to reject some positioning measurements and to select other positioning measurements to be sent to the location server 120 for position determination. In the signaling flow 500, it is assumed that the UEs 105 and 106 and location server 120 communicate using the LPP positioning protocol referred to earlier, although use of NPP or a combination of LPP and NPP or other future protocol, such as NRPPa, is also possible. It should be understood that the various messages illustrated in FIG. 5 are provided for illustration, and that additional, fewer, or different messages may be used and that the order of the signaling flow may change if desired.

At stage 1, the target UE 105 and the location server 120 perform a capability transfer, which may use LPP or NRPPa positioning protocols. For example, the location server 120 may send a request capabilities message to the target UE 105, e.g., to request the capabilities from the UE 105, and the target UE 105 returns a provide capabilities message to the location server 120, in which the target UE 105 may provide its capabilities to perform positioning. The target UE 105, for example, may indicate that it is capable of outlier rejection using relative position information of the anchor points. The target UE 105 may further indicate whether it currently has a sidelink connection with another UE, e.g., anchor UE 106.

At stage 2, the location server 120 may determine assistance data for the target UE 105 that includes configuration information for reference signals from the anchor points, e.g., base stations 110 and SL UEs 106, to be measured by the target UE 105. The location server 120 may further determine the relative position information for the anchor points, which may be, e.g., relative distances, angles, or signal strength measurements to other anchor points, as discussed above. The location server 120, for example, may calculate the relative position information based on known positions of the anchor points or the relative position information may be stored in a database. Where the anchor points include SL UEs 106, the location server 120 may determine the relative position information based on known positions of the SL UEs 106, which may be determined in previous position sessions if the SL UEs 106 are mobile, or may be stored if the SL UEs 106 are stationary.

At stage 3, the location server 120 may provide the positioning assistance data determined at stage 2 to the target UE 105.

At stage 4, the sidelink UEs 106a and 106b may optionally provide positioning assistance data, such as configuration information for reference signals, to the target UE 105. The sidelink UEs 106a and 106b may provide relative distance information to the target UE 105 (and in some implementations relative distance information to other anchor points, e.g., other sidelink UEs or base stations 110), e.g., which may be determined based on PRS measurements (e.g., RTT) performed by the sidelink UEs 106a and 106b or calculated based on the sidelink UE's estimated location and other anchor point's locations (if known).

At stage 5, the location server 120 sends a request for location information for UE-assisted positioning to the target UE 105. The request for location information may include a request that the target UE 105 perform outlier rejection using the relative position information. In other implementations, it may be implicitly understood that the target UE 105 is to perform outlier rejection of the position measurements when the assistance data received from the location server 120 includes relative position information.

At stage 6, the base stations 110 transmit reference signals for positioning, such as DL PRS, to the target UE 105.

At stage 7, the SL UEs 106 transmit reference signals for positioning, such as SL SRS, to the target UE 105.

At stage 8, the target UE 105 performs the position measurements for the reference signals received from the base stations 110 in stage 6 and from the SL UEs 106 in stage 7.

At stage 9, the target UE 105 performs outlier rejection based on the relative position information received in assistance data received in stage 3 and the positioning measurements from stage 8. For example, as discussed above, various subsets of positioning measurements and the relative position information for corresponding anchor points may be used to calculate relative positions of the target UE 105 to the corresponding anchor points, and the calculated relative positions may be compared across different subsets of positioning measurements to identify consistent or inconsistent results. Subsets of positioning measurements that produce consistent relative position calculation results may be selected to provide to the location server 120 and the remaining positioning measurements rejected as outliers. In another implementation, the ranks of matrices of various subsets of positioning measurements and corresponding relative position information may be calculated, and subsets of positioning measurements that generate a desired matrix rank may be selected to provide to the location server 120 and the remaining positioning measurements rejected as outliers. The rank test may use a predetermined threshold, that is used to compare eigen values to determine the rank of the matrix (e.g., if the fourth largest eigen value is smaller than the top three eigen values by the predetermined threshold, then the matrix may be considered a rank 3 matrix (for three-dimensional positioning).

At stage 10, the target UE 105 provides a location information report including the selected position measurements to the location server 120 for UE-assisted positioning.

At stage 11, the location server 120 determines the location of the target UE 105 based on the position measurements provided at stage 10, along with the actual locations of the anchor points, e.g., using multilateration, the intersection of multiple AoAs, etc. Thus, the location server 120 may advantageously off load the outlier rejection of position measurements to the target UE 105 by providing relative location information in assistance data, while maintaining confidentiality of the actual locations of the anchor points using the UE-assisted positioning.

Figure 6:
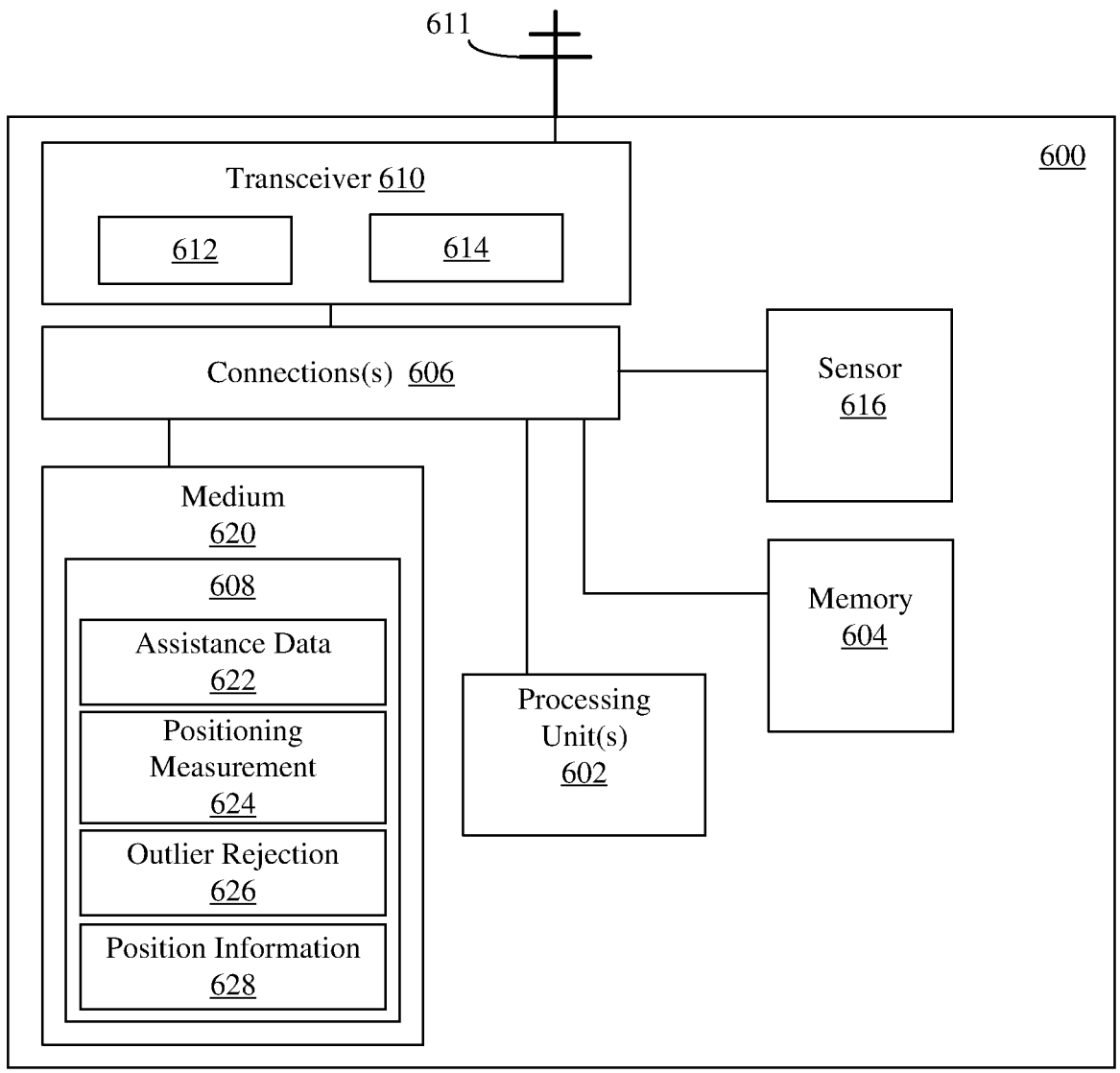
FIG. 6 shows a schematic block diagram illustrating certain exemplary features of a hardware implementation of an anchor UE.

FIG. 6 shows a schematic block diagram illustrating certain exemplary features of a hardware implementation of a UE 600, e.g., target UE 105, enabled to support positioning using relative position information of the anchor points provided in assistance data to select positioning measurements to provide to a location server for UE-assisted positioning, in a manner consistent with disclosed implementation. The UE 600 includes, e.g., hardware components such as one or more processors 602, memory 604, a sensor unit 616, and a transceiver 610 (e.g., wireless network interface), which may be operatively coupled with one or more connections 606 (e.g., buses, lines, fibers, links, etc.) to non-transitory computer readable medium 620 and memory 604. The UE 600 may further include additional items, which are not shown, such as a user interface that may include e.g., a display, a keypad or other input device, such as virtual keypad on the display, through which a user may interface with the UE, or a satellite positioning system receiver. In certain example implementations, all or part of UE 600 may take the form of a chipset, and/or the like.

The transceiver 610 may, for example, include a transmitter 612 enabled to transmit one or more signals over one or more types of wireless communication networks and a receiver 614 to receive one or more signals transmitted over the one or more types of wireless communication networks. In some embodiments, UE 600 may include antenna 611, which may be internal or external. UE antenna 611 may be used to transmit and/or receive signals processed by transceiver 610. In some embodiments, UE antenna 611 may be coupled to transceiver 610. In some embodiments, measurements of signals received (transmitted) by UE 600 may be performed at the point of connection of the UE antenna 611 and transceiver 610. For example, the measurement point of reference for received (transmitted) RF signal measurements may be an input (output) terminal of the receiver 614 (transmitter 612) and an output (input) terminal of the UE antenna 611. In a UE 600 with an antenna 611 that includes multiple antennas or an antenna array, the antenna connector may be viewed as a virtual point representing the aggregate output (input) of multiple UE antennas. The phase difference of received signals at multiple antennas or antenna array may be used to the AoA of the signal with respect to the antenna array, which may be converted to a local or global reference frame based on a known orientation of the UE 600. In some embodiments, UE 600 may measure received signals including timing measurements, angle measurements, or signal strength measurements and the raw measurements may be processed by the one or more processors 602.

The sensor unit 616 may comprise, for example, one or more of various types of sensors such as one or more inertial sensors, one or more magnetometers, one or more environment sensors, one or more optical sensors, one or more weight sensors, and/or one or more radio frequency (RF) sensors, etc. For example, the sensor unit 616 may include one or more accelerometers (e.g., collectively responding to acceleration of the UE 600 in three dimensions) and/or one or more gyroscopes (e.g., three-dimensional gyroscope(s)), one or more magnetometers (e.g., three-dimensional magnetometer(s)) to determine orientation (e.g., relative to magnetic north and/or true north), one or more temperature sensors, one or more barometric pressure sensors, one or more ambient light sensors, one or more camera imagers, and/or one or more microphones, etc. The sensor unit 616 may generate analog and/or digital signals indications of which may be stored in the memory 604 and processed by the processing units 602 in support of one or more applications such as, for example, applications directed to positioning and/or navigation operations. The sensor unit 616 may be used in relative location measurements, relative location determination, motion determination, etc. Information detected by the sensor unit 616 may be used for motion detection, relative displacement, dead reckoning, sensor-based location determination, and/or sensor-assisted location determination. The sensor unit 616, for example, may be useful to determine the orientation of the target UE 600. The orientation of the UE 600 may be used to convert the AoA of reference signals received from anchor points to a local or global reference frame.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of UE 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in UE 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in UE 600 is merely exemplary, and as such the functionality of the modules and/or data structures may be combined, separated, and/or be structured in different ways depending upon the implementation of the UE 600.

The medium 620 and/or memory 604 may include an assistance data unit 622 that when implemented by the one or more processors 602 configures the one or more processors 602 to receive, via the transceiver 610, assistance data from a location server and/or sidelink UEs that includes, e.g., relative position information for anchor points, such as base stations and sidelink UEs. The relative position information, for example, may include at least one of distances between the base stations, angles between the base stations, or a combination thereof, as well as at least one of distance or angle between an each sidelink UE and each base station or other sidelink UE or signal strength measured by each sidelink UE from transmissions from each base station or other sidelink UE.

The medium 620 and/or memory 604 may include an positioning measurement unit 624 that when implemented by the one or more processors 602 configures the one or more processors 602 to receive, via the transceiver 610, reference signals from base stations, such as DL PRS, or reference signals from sidelink UEs, such as SL-SRS, and to perform positioning measurements, such as timing measurement such as TOA, Rx-Tx, RTT, etc., an angle measurement such as AoA, or signal strength measurements, such as RSRP, or a combination thereof.

The medium 620 and/or memory 604 may include an outlier rejection unit 626 that when implemented by the one or more processors 602 configures the one or more processors 602 to perform outlier rejection of the positioning measurements based on the relative position information for the anchor points, such as the base stations or sidelink UEs. For example, the one or more processors 602 may be configured to perform RANSAC or RAIM outlier rejection procedures. The one or more processors 602 may be configured to select positioning measurements to send to the location server and to reject the remaining positioning measurements.

The medium 620 and/or memory 604 may include a position information report unit 628 that when implemented by the one or more processors 602 configures the one or more processors 602 to send, via the transceiver, positioning measurements from the anchor points that are selected based on the relative position information.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program 608. For example, the non-transitory computer readable medium including program code 608 stored thereon may include program code 608 to support operation as a target UE using sidelink positioning for a target UE that is not capable of sidelink positioning in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include a transceiver 610 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable code 608 stored thereon, which if executed by at least one processor 602 may be operatively enabled to perform all or portions of the example operations as described herein. Computer readable medium 620 may be a part of memory 604.

Figure 7:
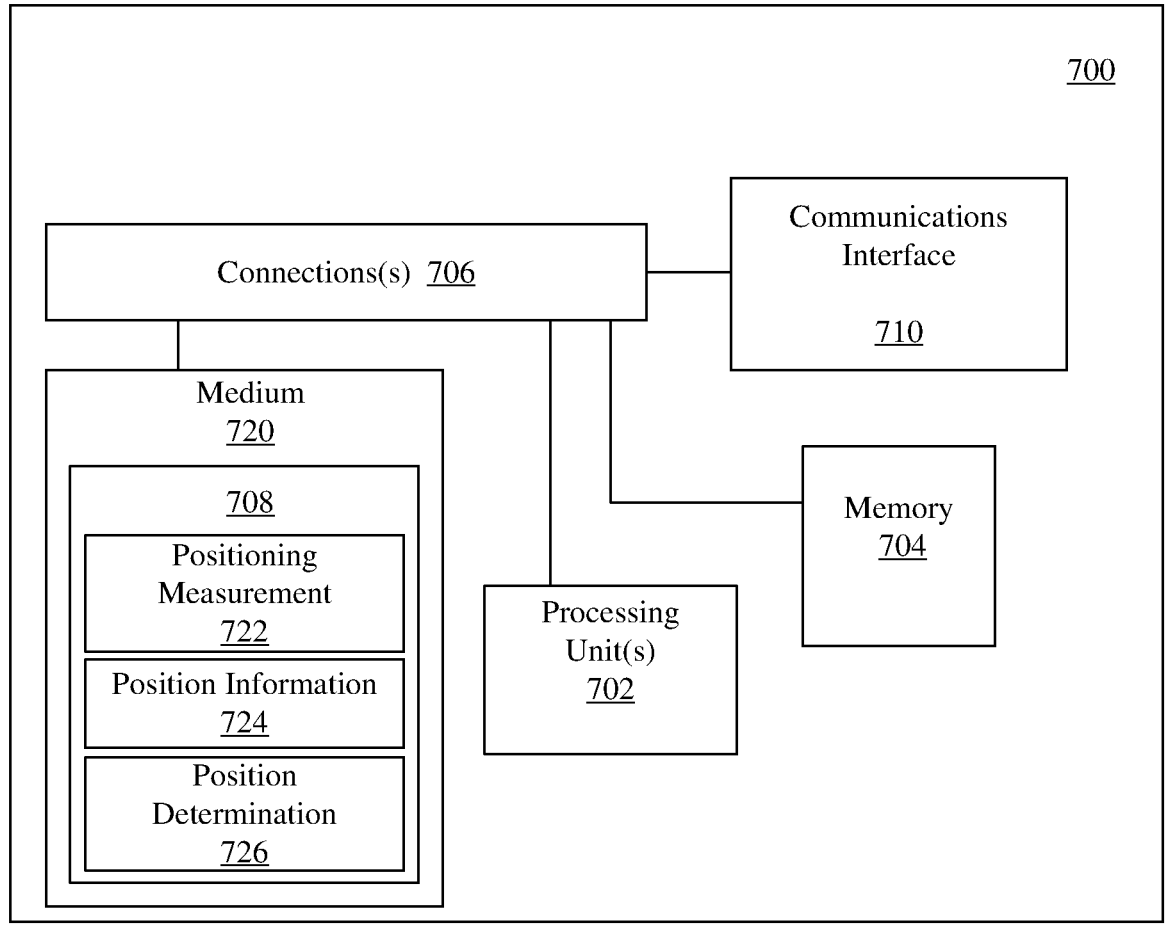
FIG. 7 shows a schematic block diagram illustrating certain exemplary features of a hardware implementation of a location server.

FIG. 7 is a schematic block diagram illustrating certain exemplary features of a hardware implementation of a location server 700, such as LMF 120, enabled to support positioning of a target UE, such as target UE 105, in which relative position information of the anchor points is provided in assistance data to the target UE 105 and used by the target UE 105 to select positioning measurements to provide to the location server 120 for UE-assisted positioning, in a manner consistent with disclosed implementation. The location server 700 includes, e.g., hardware components such as one or more processors 702, memory 704, and a communications interface 710, which may be operatively coupled with one or more connections 706 (e.g., buses, lines, fibers, links, etc.) to non-transitory computer readable medium 720 and memory 704. The external interface 710 may be a wired and/or wireless interface capable of connecting to a transmission-reception point or a base station or, such as gNBs 110, via one or more intermediate entities, such as an AMF, and capable of communicating with UEs, such as a target UE 105 and any sidelink UEs 106 used as anchor points.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of location server 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in location server 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in location server 700 is merely exemplary, and as such the functionality of the modules and/or data structures may be combined, separated, and/or be structured in different ways depending upon the implementation of the location server 700.

The medium 720 and/or memory 704 may include a position measurement unit 722 that when implemented by the one or more processors 702 configures the one or more processors 702 to determine and send, via the external interface 710, assistance data to a target UE that includes, e.g., relative position information for anchor points, such as base stations and sidelink UEs. The relative position information, for example, may include at least one of distances between the base stations, angles between the base stations, or a combination thereof, as well as at least one of distance or angle between an each sidelink UE and each base station or other sidelink UE or signal strength measured by each sidelink UE from transmissions from each base station or other sidelink UE. The one or more processors 702 may be configured, for example to determine the relative position information based on known positions of the anchor points.

The medium 720 and/or memory 704 may include a position information report unit 724 that when implemented by the one or more processors 702 configures the one or more processors 702 to receive from the UE, via the external interface 710, positioning measurements from the anchor points, e.g., base stations and/or sidelink UEs, that are selected based on the relative position information.

The medium 720 and/or memory 704 may include a position determination unit 726 that when implemented by the one or more processors 702 configures the one or more processors 702 to determine a position of the UE based using the positioning measurements received from the UE in a UE-assisted positioning process. For example, the position measurements, along with the actual positions of the base stations and sidelink UEs, may be used to determine the position of the target UE using multilateration, the intersection of multiple AoAs, or other known positioning techniques.

The methodologies described herein may be implemented by various means depending upon the application. For example, these methodologies may be implemented in hardware, firmware, software, or any combination thereof. For a hardware implementation, the one or more processors may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory and executed by one or more processor units, causing the processor units to operate as a special purpose computer programmed to perform the algorithms disclosed herein. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support operation as a target UE using sidelink positioning for a target UE that is not capable of sidelink positioning in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer-readable storage medium, instructions and/or data may be provided as signals on transmission media included in a communication apparatus. For example, a communication apparatus may include a transceiver having signals indicative of instructions and data. The instructions and data are stored on non-transitory computer readable media, e.g., memory 704, and are configured to cause the one or more processors to operate as a special purpose computer programmed to perform the procedures and techniques disclosed herein. That is, the communication apparatus includes transmission media with signals indicative of information to perform disclosed functions.

Figure 8:
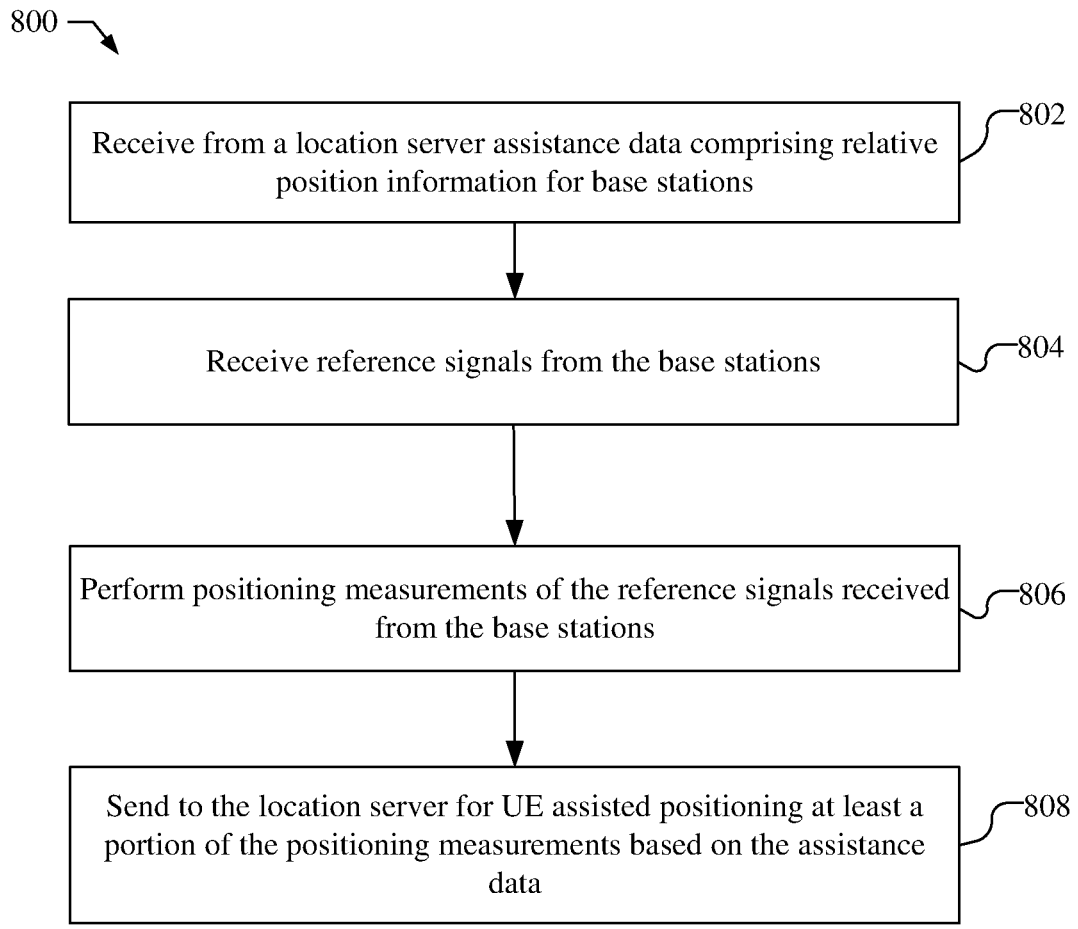
FIG. 8 shows a flowchart for an exemplary method to support positioning of a target UE.

FIG. 8 shows a flowchart for an exemplary method 800 performed by a UE, such as UE 105, to support positioning, in a manner consistent with disclosed implementation.

At block 802, the UE may receive from a location server assistance data comprising relative position information for base stations, e.g., as discussed stages 2, 3, and 4 of FIG. 5. The relative position information for the base stations, for example, may comprise at least one of distances between the base stations, angles between the base stations, or a combination thereof. In some implementations, the relative position information for the base stations may include artificial uncertainty added to the at least one of distances between the base stations, angles between the base stations, or the combination thereof. A means for receiving from a location server assistance data comprising relative position information for base stations may be, e.g., the wireless transceiver 610 and one or more processors 602 with dedicated hardware or implementing executable code or software instructions in memory 604 and/or medium 620 such as the assistance data unit 622.

At block 806, the UE may receive reference signals from the base stations, e.g., as discussed at stages 6 of FIG. 5. A means for receiving reference signals from the base stations may be, e.g., the wireless transceiver 610 and one or more processors 602 with dedicated hardware or implementing executable code or software instructions in memory 604 and/or medium 620 such as the positioning measurement unit 624.

At block 806, the UE may perform positioning measurements of the reference signals received from the base stations, e.g., as discussed at stages 6, 7, and 8 of FIG. 5. A means for performing positioning measurements of the reference signals received from the base stations may be, e.g., the wireless transceiver 610 and one or more processors 602 with dedicated hardware or implementing executable code or software instructions in memory 604 and/or medium 620 such as the positioning measurement unit 624.

At block 808, the UE sends to the location server for UE assisted positioning at least a portion of the positioning measurements based on the assistance data, e.g., as discussed at stage 10 of FIG. 5. A means for sending to the location server for UE assisted positioning at least a portion of the positioning measurements based on the assistance data may be, e.g., the wireless transceiver 610 and one or more processors 602 with dedicated hardware or implementing executable code or software instructions in memory 604 and/or medium 620 such as the outlier rejection unit 626 and the position information report unit 628.

In some implementations, the UE may perform outlier rejection of the positioning measurements based on the relative position information for the base stations, e.g., as discussed at stage 9 of FIG. 5. The UE may select the at least the portion of the positioning measurements to send to the location server based on the outlier rejection of the positioning measurements, e.g., as discussed at stage 9 of FIG. 5. A means for performing outlier rejection of the positioning measurements based on the relative position information for the base stations may be, e.g., the one or more processors 602 with dedicated hardware or implementing executable code or software instructions in memory 604 and/or medium 620 such as the outlier rejection unit 626. A means for selecting the at least the portion of the positioning measurements to send to the location server based on the outlier rejection of the positioning measurements may be, e.g., the one or more processors 602 with dedicated hardware or implementing executable code or software instructions in memory 604 and/or medium 620 such as the outlier rejection unit 626.

In one implementation, the UE may receive assistance data with relative position information for one or more sidelink UEs, e.g., as discussed at stages 2, 3, and 4 of FIG. 5. For example, the assistance data with the relative position information for the one or more sidelink UEs may be received from the location server or from the one or more sidelink UEs. In one implementation, the assistance data with the relative position information for the one or more sidelink UEs may be at least one of distance or angle between each sidelink UE and each base station or other sidelink UE or signal strength measured by each sidelink UE from transmissions from each base station or other sidelink UE. The UE may perform positioning measurements of reference signals received from the one or more sidelink UEs, e.g., as discussed at stages 7 and 8 of FIG. 5. The UE may send to the location server for the UE assisted positioning at least a portion of the positioning measurements of the reference signals received from the one or more sidelink UEs based on the assistance data with the relative position information for the one or more sidelink UEs, e.g., as discussed at stages 9 and 10 of FIG. 5. A means for receiving assistance data with relative position information for one or more sidelink UEs may be, e.g., the wireless transceiver 610 and one or more processors 602 with dedicated hardware or implementing executable code or software instructions in memory 604 and/or medium 620 such as the assistance data unit 622. A means for performing positioning measurements of reference signals received from the one or more sidelink UEs may be, e.g., the wireless transceiver 610 and one or more processors 602 with dedicated hardware or implementing executable code or software instructions in memory 604 and/or medium 620 such as the positioning measurement unit 624. A means for sending to the location server for the UE assisted positioning at least a portion of the positioning measurements of the reference signals received from the one or more sidelink UEs based on the assistance data with the relative position information for the one or more sidelink UEs may be, e.g., the wireless transceiver 610 and one or more processors 602 with dedicated hardware or implementing executable code or software instructions in memory 604 and/or medium 620 such as the outlier rejection unit 626 and the position information report unit 628.

Figure 9:
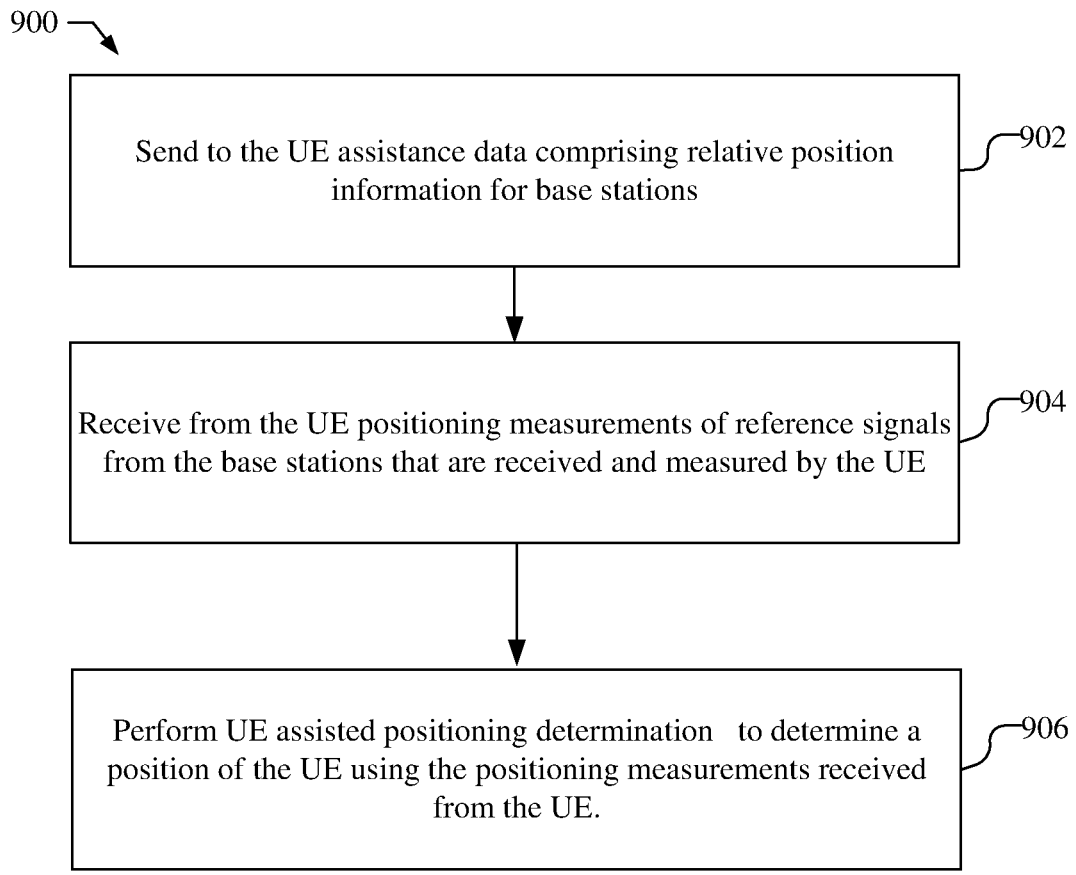
FIG. 9 shows a flowchart for an exemplary method to support positioning of a target UE.

FIG. 9 shows a flowchart for an exemplary method 900 supporting positioning of a user equipment (UE) performed by a location server, such as LMF 120 or an or E-SMLC, in a manner consistent with disclosed implementation.

At block 902, the location server sends to the UE assistance data comprising relative position information for base stations, e.g., as discussed stages 2 and 3 of FIG. 5. The relative position information for the base stations, for example, may comprise at least one of distances between the base stations, angles between the base stations, or a combination thereof. In some implementations, the relative position information for the base stations may include artificial uncertainty added to the at least one of distances between the base stations, angles between the base stations, or the combination thereof. A means for sending to the UE assistance data comprising relative position information for base stations may be, e.g., the external interface 710 and one or more processors 702 with dedicated hardware or implementing executable code or software instructions in memory 704 and/or medium 720 such as the assistance data unit 722.

At block 904, the location receives from the UE positioning measurements of reference signals that are transmitted from the base stations and that are received and measured by the UE, e.g., as discussed at stage 10 of FIG. 5. A means for receiving from the UE positioning measurements of reference signals that are transmitted from the base stations and that are received and measured by the UE may be, e.g., the external interface 710 and one or more processors 702 with dedicated hardware or implementing executable code or software instructions in memory 704 and/or medium 720 such as the position information report unit 724.

At block 906, the location server performs UE assisted position determination to determine a position of the UE using the positioning measurements received from the UE, e.g., as discussed at stage 11 of FIG. 5. A means for performing UE assisted position determination to determine a position of the UE using the positioning measurements received from the UE may be, e.g., the one or more processors 702 with dedicated hardware or implementing executable code or software instructions in memory 704 and/or medium 720 such as the position determination unit 726.

In one implementation, the positioning measurements received from the UE are selected based on the outlier rejection of the positioning measurements and the outlier rejection may be based on the relative position information for the base stations, e.g., as discussed at stages 9 and 10 of FIG. 5. For example, the UE may perform the outlier rejection of positioning measurements measured from the base stations based on the relative position information for the base stations and the positioning measurements received from the UE are selected by the UE based on the outlier rejection of the positioning measurements.

In one implementation, the location receiver receives from the UE positioning measurements of reference signals from one or more sidelink UEs that are received and measured by the UE, wherein determining the position of the UE is further based on the positioning measurements of the reference signals from the one or more sidelink UEs, e.g., as discussed at stage 7, 8, 9, 10, and 11 of FIG. 5. For example, the assistance data sent to the UE may further include relative position information for the one or more sidelink UEs. In some implementations, the assistance data with the relative position information for the one or more sidelink UEs may include at least one of distance or angle between each sidelink UE and each base station or other sidelink UE or signal strength level measured by each sidelink UE from transmissions from each base station or other sidelink UE. A means for receiving from the UE positioning measurements of reference signals from one or more sidelink UEs that are received and measured by the UE may be, e.g., the external interface 710 and one or more processors 702 with dedicated hardware or implementing executable code or software instructions in memory 704 and/or medium 720 such as the assistance data unit 722.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a mobile device, user equipment (UE), or mobile station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable mobile device which is capable of receiving wireless communication and/or navigation signals, such as navigation positioning signals. The term "mobile station" (or "mobile device". "wireless device" or "user equipment") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, a "mobile station" or "user equipment" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station" or "user equipment." A mobile device or user equipment (UE) may also be referred to as a mobile terminal, a terminal, a device, a Secure User Plane Location Enabled Terminal (SET), a target device, a target, or by some other name.

In an embodiment, a first example independent claim may include a method for supporting location of a user equipment (UE) at a first wireless node, comprising receiving a first request for broadcast of an increased quantity of location-related information, the broadcast based on a wireless access type for the first wireless node; and broadcasting the increased quantity of location-related information using the wireless access type and based on the first request.

While some of the techniques, processes, and/or implementations presented herein may comply with all or part of one or more standards, such techniques, processes, and/or implementations may not, in some embodiments, comply with part or all of such one or more standards.

Implementation examples are described in the following numbered clauses:

1. A method for supporting positioning of a user equipment (UE) performed by the UE, comprising:
   receiving from a location server assistance data comprising relative position information for base stations;
   receiving reference signals from the base stations;
   performing positioning measurements of the reference signals received from the base stations; and
   sending to the location server for UE assisted positioning at least a portion of the positioning measurements based on the assistance data.

2. The method of clause 1, wherein the relative position information for the base stations comprises at least one of distances between the base stations, angles between the base stations, or a combination thereof.

3. The method of clause 2, wherein the relative position information for the base stations comprises artificial uncertainty added to the at least one of distances between the base stations, angles between the base stations, or the combination thereof.

4. The method of any of clauses 1-3, further comprising:
   performing outlier rejection of the positioning measurements based on the relative position information for the base stations; and
   selecting the at least the portion of the positioning measurements to send to the location server based on the outlier rejection of the positioning measurements.

5. The method of any of clauses 1-4, further comprising:
   receiving assistance data with relative position information for one or more sidelink UEs;
   performing positioning measurements of reference signals received from the one or more sidelink UEs; and
   sending to the location server for the UE assisted positioning at least a portion of the positioning measurements of the reference signals received from the one or more sidelink UEs based on the assistance data with the relative position information for the one or more sidelink UEs.

6. The method of clause 5, wherein the assistance data with the relative position information for the one or more sidelink UEs is received from the location server or from the one or more sidelink UEs.

7. The method of clause 5, wherein the assistance data with the relative position information for the one or more sidelink UEs comprises at least one of distance or angle between each sidelink UE and each base station or other sidelink UE or signal strength measured by each sidelink UE from transmissions from each base station or other sidelink UE.

8. A user equipment (UE) configured for supporting positioning of the UE, comprising:
   a wireless transceiver configured to wirelessly communicate with entities in a wireless network;
   at least one memory;
   at least one processor coupled to the wireless transceiver and the at least one memory, wherein the at least one processor is configured to:
   receive from a location server assistance data comprising relative position information for base stations;
   receive reference signals from the base stations;
   perform positioning measurements of the reference signals received from the base stations; and
   send to the location server for UE assisted positioning at least a portion of the positioning measurements based on the assistance data.

9. The UE of clause 8, wherein the relative position information for the base stations comprises at least one of distances between the base stations, angles between the base stations, or a combination thereof.

10. The UE of clause 9, wherein the relative position information for the base stations comprises artificial uncertainty added to the at least one of distances between the base stations, angles between the base stations, or the combination thereof.

11. The UE of any of clauses 8-10, wherein the at least one processor is further configured to:
   perform outlier rejection of the positioning measurements based on the relative position information for the base stations; and
   select the at least the portion of the positioning measurements to send to the location server based on the outlier rejection of the positioning measurements.

12. The UE of any of clauses 8-11, wherein the at least one processor is further configured to:
   receive assistance data with relative position information for one or more sidelink UEs;
   perform positioning measurements of reference signals received from the one or more sidelink UEs; and
   send to the location server for the UE assisted positioning at least a portion of the positioning measurements of the reference signals received from the one or more sidelink UEs based on the assistance data with the relative position information for the one or more sidelink UEs.

13. The UE of clause 12, wherein the assistance data with the relative position information for the one or more sidelink UEs is received from the location server or from the one or more sidelink UEs.

14. The UE of clause 12, wherein the assistance data with the relative position information for the one or more sidelink UEs comprises at least one of distance or angle between each sidelink UE and each base station or other sidelink UE or signal strength measured by each sidelink UE from transmissions from each base station or other sidelink UE.

15. A user equipment (UE) configured for supporting positioning of the UE, comprising:
   means for receiving from a location server assistance data comprising relative position information for base stations;
   means for receiving reference signals from the base stations;
   means for performing positioning measurements of the reference signals received from the base stations; and means for sending to the location server for UE assisted positioning at least a portion of the positioning measurements based on the assistance data.

16. The UE of clause 15, wherein the relative position information for the base stations comprises at least one of distances between the base stations, angles between the base stations, or a combination thereof.

17. The UE of clause 16, wherein the relative position information for the base stations comprises artificial uncertainty added to the at least one of distances between the base stations, angles between the base stations, or the combination thereof.

18. The UE of any of clauses 15-17, further comprising:
means for performing outlier rejection of the positioning measurements based on the relative position information for the base stations; and
means for selecting the at least the portion of the positioning measurements to send to the location server based on the outlier rejection of the positioning measurements.

19. The UE of any of clauses 15-18, further comprising:
means for receiving assistance data with relative position information for one or more sidelink UEs;
means for performing positioning measurements of reference signals received from the one or more sidelink UEs; and
means for sending to the location server for the UE assisted positioning at least a portion of the positioning measurements of the reference signals received from the one or more sidelink UEs based on the assistance data with the relative position information for the one or more sidelink UEs.

20. The UE of clause 19, wherein the assistance data with the relative position information for the one or more sidelink UEs is received from the location server or from the one or more sidelink UEs.

21. The UE of clause 19, wherein the assistance data with the relative position information for the one or more sidelink UEs comprises at least one of distance or angle between each sidelink UE and each base station or other sidelink UE or signal strength measured by each sidelink UE from transmissions from each base station or other sidelink UE.

22. A non-transitory storage medium including program code stored thereon, the program code is operable to configure at least one processor in a user equipment (UE) for supporting positioning of the UE, comprising:
program code to receive from a location server assistance data comprising relative position information for base stations;
program code to receive reference signals from the base stations;
program code to perform positioning measurements of the reference signals received from the base stations; and
program code to send to the location server for UE assisted positioning at least a portion of the positioning measurements based on the assistance data.

23. The non-transitory storage medium of clause 22, wherein the relative position information for the base stations comprises at least one of distances between the base stations, angles between the base stations, or a combination thereof.

24. The non-transitory storage medium of clause 23, wherein the relative position information for the base stations comprises artificial uncertainty added to the at least one of distances between the base stations, angles between the base stations, or the combination thereof.

25. The non-transitory storage medium of any of clauses 22-24, further comprising:

program code to perform outlier rejection of the positioning measurements based on the relative position information for the base stations; and
program code to select the at least the portion of the positioning measurements to send to the location server based on the outlier rejection of the positioning measurements.

26. The non-transitory storage medium of any of clauses 22-25, further comprising:
program code to receive assistance data with relative position information for one or more sidelink UEs;
program code to perform positioning measurements of reference signals received from the one or more sidelink UEs; and
program code to send to the location server for the UE assisted positioning at least a portion of the positioning measurements of the reference signals received from the one or more sidelink UEs based on the assistance data with the relative position information for the one or more sidelink UEs.

27. The non-transitory storage medium of clause 26, wherein the assistance data with the relative position information for the one or more sidelink UEs is received from the location server or from the one or more sidelink UEs.

28. The non-transitory storage medium of clause 26, wherein the assistance data with the relative position information for the one or more sidelink UEs comprises at least one of distance or angle between each sidelink UE and each base station or other sidelink UE or signal strength measured by each sidelink UE from transmissions from each base station or other sidelink UE.

29. A method for supporting positioning of a user equipment (UE) performed by a location server, comprising:
sending to the UE assistance data comprising relative position information for base stations;
receiving from the UE positioning measurements of reference signals from the base stations that are received and measured by the UE; and
performing UE assisted position determination to determine a position of the UE using the positioning measurements received from the UE.

30. The method of clause 29, wherein the relative position information for the base stations comprises at least one of distances between the base stations, angles between the base stations, or a combination thereof.

31. The method of clause 30, wherein the relative position information for the base stations comprises artificial uncertainty added to the at least one of distances between the base stations, angles between the base stations, or the combination thereof.

32. The method of any of clauses 29-31, wherein the positioning measurements received from the UE are selected based on outlier rejection of the positioning measurements and wherein the outlier rejection is based on the relative position information for the base stations.

33. The method of any of clauses 29-32, wherein comprising:
receiving from the UE positioning measurements of reference signals from one or more sidelink UEs that are received and measured by the UE;
wherein determining the position of the UE is further based on the positioning measurements of the reference signals from the one or more sidelink UEs.

34. The method of clause 33, wherein the assistance data sent to the UE further comprises relative position information for the one or more sidelink UEs.

35. The method of clause 34, wherein the assistance data with the relative position information for the one or more sidelink UEs comprises at least one of distance or angle between each sidelink UE and each base station or other sidelink UE or signal strength level measured by each sidelink UE from transmissions from each base station or other sidelink UE.

36. A location server configured for supporting positioning of a user equipment (UE), comprising:
an external interface configured to communicate with entities in a wireless network;
at least one memory;
at least one processor coupled to the external interface and the at least one memory, wherein the at least one processor is configured to:
send to the UE assistance data comprising relative position information for base stations;
receive from the UE positioning measurements of reference signals from the base stations that are received and measured by the UE; and
perform UE assisted position determination to determine a position of the UE using the positioning measurements received from the UE.

37. The location server of clause 36, wherein the relative position information for the base stations comprises at least one of distances between the base stations, angles between the base stations, or a combination thereof.

38. The location server of clause 37, wherein the relative position information for the base stations comprises artificial uncertainty added to the at least one of distances between the base stations, angles between the base stations, or the combination thereof.

39. The location server of any of clauses 36-38, wherein the positioning measurements received from the UE are selected based on outlier rejection of the positioning measurements and wherein the outlier rejection is based on the relative position information for the base stations.

40. The location server of any of clauses 36-39, wherein the at least one processor is further configured to:
receive from the UE positioning measurements of reference signals from one or more sidelink UEs that are received and measured by the UE;
wherein the at least one processor is configured to determine the position of the UE further based on the positioning measurements of the reference signals from the one or more sidelink UEs.

41. The location server of clause 40, wherein the assistance data sent to the UE further comprises relative position information for the one or more sidelink UEs.

42. The location server of clause 41, wherein the assistance data with the relative position information for the one or more sidelink UEs comprises at least one of distance or angle between each sidelink UE and each base station or other sidelink UE or signal strength level measured by each sidelink UE from transmissions from each base station or other sidelink UE.

43. A location server configured for supporting positioning of a user equipment (UE), comprising:
means for sending to the UE assistance data comprising relative position information for base stations;
means for receiving from the UE positioning measurements of reference signals from the base stations that are received and measured by the UE; and
means for performing UE assisted position determination to determine a position of the UE using the positioning measurements received from the UE.

44. The location server of clause 43, wherein the relative position information for the base stations comprises at least one of distances between the base stations, angles between the base stations, or a combination thereof.

45. The location server of clause 44, wherein the relative position information for the base stations comprises artificial uncertainty added to the at least one of distances between the base stations, angles between the base stations, or the combination thereof.

46. The location server of any of clauses 43-45, wherein the positioning measurements received from the UE are selected based on outlier rejection of the positioning measurements and wherein the outlier rejection is based on the relative position information for the base stations.

47. The location server of any of clauses 43-46, wherein comprising:
means for receiving from the UE positioning measurements of reference signals from one or more sidelink UEs that are received and measured by the UE;
wherein the means for determining the position of the UE is further based on the positioning measurements of the reference signals from the one or more sidelink UEs.

48. The location server of clause 47, wherein the assistance data sent to the UE further comprises relative position information for the one or more sidelink UEs.

49. The location server of clause 48, wherein the assistance data with the relative position information for the one or more sidelink UEs comprises at least one of distance or angle between each sidelink UE and each base station or other sidelink UE or signal strength level measured by each sidelink UE from transmissions from each base station or other sidelink UE.

50. A non-transitory storage medium including program code stored thereon, the program code is operable to configure at least one processor in a location server for supporting positioning of a user equipment (UE), comprising:
program code to send to the UE assistance data comprising relative position information for base stations;
program code to receive from the UE positioning measurements of reference signals from the base stations that are received and measured by the UE; and
program code to perform UE assisted position determination to determine a position of the UE using the positioning measurements received from the UE.

51. The non-transitory storage medium of clause 50, wherein the relative position information for the base stations comprises at least one of distances between the base stations, angles between the base stations, or a combination thereof.

52. The non-transitory storage medium of clause 51, wherein the relative position information for the base stations comprises artificial uncertainty added to the at least one of distances between the base stations, angles between the base stations, or the combination thereof.

53. wherein the positioning measurements received from the UE are selected based on outlier rejection of the positioning measurements and wherein the outlier rejection is based on the relative position information for the base stations.

54. The non-transitory storage medium of any of clauses 50-53, wherein comprising:
program code to receive from the UE positioning measurements of reference signals from one or more sidelink UEs that are received and measured by the UE;
wherein the program code to determine the position of the UE is further based on the positioning measurements of the reference signals from the one or more sidelink UEs.

55. The non-transitory storage medium of clause 54, wherein the assistance data sent to the UE further comprises relative position information for the one or more sidelink UEs.

56. The non-transitory storage medium of clause 55, wherein the assistance data with the relative position information for the one or more sidelink UEs comprises at least one of distance or angle between each sidelink UE and each base station or other sidelink UE or signal strength level measured by each sidelink UE from transmissions from each base station or other sidelink UE.

Although particular embodiments have been disclosed herein in detail, this has been done by way of example for purposes of illustration only and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for supporting positioning of a user equipment (UE) performed by the UE, comprising:
    receiving from a location server assistance data comprising relative position information between base stations;
    receiving reference signals from the base stations;
    performing positioning measurements of the reference signals received from the base stations;
    calculating relative positions of the UE using the positioning measurements and the assistance data;
    performing outlier rejection, wherein the outlier rejection involves comparing the calculated relative positions across different subsets of the positioning measurements to identify one or more positioning measurements as being associated with an inconsistent relative position;
    selecting a subset of positioning measurements to send to the location server, wherein the subset of positioning measurements is selected to exclude the one or more positioning measurements identified from the outlier rejection; and
    sending the subset of positioning measurements to the location server for UE assisted positioning.

2. The method of claim 1, wherein the relative position information between the base stations comprises at least one of distances between the base stations, angles between the base stations, or a combination thereof.

3. The method of claim 1, wherein the comparing of the calculated relative positions across different subsets of the positioning measurements is based on the relative position information between the base stations.

4. The method of claim 1, further comprising:
    receiving additional assistance data, the additional assistance data comprising position information relative to one or more sidelink UEs;
    performing positioning measurements of reference signals received from the one or more sidelink UEs; and
    sending to the location server for the UE assisted positioning at least a portion of the positioning measurements of the reference signals received from the one or more sidelink UEs based on the additional assistance data.

5. The method of claim 4, wherein the additional assistance data is received from the location server or from the one or more sidelink UEs.

6. The method of claim 4, wherein the additional assistance data comprises at least one of distance or angle between each sidelink UE and each base station or other sidelink UE or signal strength measured by each sidelink UE from transmissions from each base station or other sidelink UE.

7. A method for supporting positioning of a user equipment (UE) performed by the UE, comprising:
    receiving from a location server assistance data comprising relative position information between base stations, wherein the relative position information between the base stations comprises at least one of distances between the base stations, angles between the base stations, or a combination thereof, and wherein the relative position information between the base stations further comprises artificial uncertainty added to the at least one of distances between the base stations, angles between the base stations, or the combination thereof;
    receiving reference signals from the base stations;
    performing positioning measurements of the reference signals received from the base stations; and
    sending to the location server for UE assisted positioning at least a portion of the positioning measurements based on the assistance data.

8. A user equipment (UE) configured for supporting positioning of the UE, comprising:
    a wireless transceiver configured to wirelessly communicate with entities in a wireless network;
    at least one memory; and
    at least one processor coupled to the wireless transceiver and the at least one memory, wherein the at least one processor is configured to:
        receive from a location server assistance data comprising relative position information between base stations;
        receive reference signals from the base stations;
        perform positioning measurements of the reference signals received from the base stations;
        calculate relative positions of the UE using the positioning measurements and the assistance data;
        perform outlier rejection, wherein the outlier rejection involves comparing the calculated relative positions across different subsets of the positioning measurements to identify one or more positioning measurements as being associated with an inconsistent relative position;
        select a subset of positioning measurements to send to the location server, wherein the subset of positioning measurements is selected to exclude the one or more positioning measurements identified from the outlier rejection; and
        send the subset of positioning measurements to the location server for UE assisted positioning.

9. The UE of claim 8, wherein the relative position information between the base stations comprises at least one of distances between the base stations, angles between the base stations, or a combination thereof.

10. The UE of claim 8, wherein the at least one processor is further configured to:
    compare the calculated relative positions across different subsets of the positioning measurements based on the relative position information between the base stations.

11. The UE of claim 8, wherein the at least one processor is further configured to:

receive additional assistance data, the additional assistance data comprising position information relative to one or more sidelink UEs;

perform positioning measurements of reference signals received from the one or more sidelink UEs; and send to the location server for the UE assisted positioning at least a portion of the positioning measurements of the reference signals received from the one or more sidelink UEs based on the additional assistance data.

12. The UE of claim 11, wherein the additional assistance data is received from the location server or from the one or more sidelink UEs.

13. The UE of claim 11, wherein the additional assistance data comprises at least one of distance or angle between each sidelink UE and each base station or other sidelink UE or signal strength measured by each sidelink UE from transmissions from each base station or other sidelink UE.

14. A user equipment (UE) configured for supporting positioning of the UE, comprising:
    a wireless transceiver configured to wirelessly communicate with entities in a wireless network;
    at least one memory; and
    at least one processor coupled to the wireless transceiver and the at least one memory, wherein the at least one processor is configured to:
        receive from a location server assistance data comprising relative position information between base stations, wherein the relative position information between the base stations comprises at least one of distances between the base stations, angles between the base stations, or a combination thereof, and wherein the relative position information between the base stations further comprises artificial uncertainty added to the at least one of distances between the base stations, angles between the base stations, or the combination thereof;
        receive reference signals from the base stations;
        perform positioning measurements of the reference signals received from the base stations; and
        send to the location server for UE assisted positioning at least a portion of the positioning measurements based on the assistance data.

15. A user equipment (UE) configured for supporting positioning of the UE, comprising:
    means for receiving from a location server assistance data comprising relative position information between base stations;
    means for receiving reference signals transmitted by the base stations;
    means for performing positioning measurements of the reference signals received from the base stations;
    means for calculating relative positions of the UE using the positioning measurements and the assistance data;
    means for performing outlier rejection, wherein the outlier rejection involves comparing the calculated relative positions across different subsets of the positioning measurements to identify one or more positioning measurements as being associated with an inconsistent relative position;
    means for selecting a subset of positioning measurements to send to the location server, wherein the subset of positioning measurements is selected to exclude the one or more positioning measurements identified from the outlier rejection; and
    means for sending the subset of positioning measurements to the location server for UE assisted positioning.

16. The UE of claim 15, wherein the means for performing outlier rejection is configured to compare the calculated relative positions across different subsets of the positioning measurements based on the relative position information between the base stations.

17. A method for supporting positioning of a user equipment (UE) performed by a location server, comprising:
    sending to the UE assistance data comprising relative position information between base stations;
    receiving from the UE a subset of positioning measurements, the subset of positioning measurements being selected from a larger set of positioning measurements of reference signals from the base stations that are received and measured by the UE, wherein the subset of positioning measurements is selected by the UE based on:
        calculation of relative positions of the UE using the larger set of positioning measurements and the assistance data; and
        comparison of the calculated relative positions across different subsets of positioning measurements to identify and exclude one or more positioning measurements associated with an inconsistent relative position; and
    performing UE assisted position determination to determine a position of the UE using the subset of positioning measurements received from the UE.

18. The method of claim 17, wherein the relative position information between the base stations comprises at least one of distances between the base stations, angles between the base stations, or a combination thereof.

19. The method of claim 17, wherein the comparison of the calculated relative positions across different subsets of positioning measurements is based on the relative position information between the base stations.

20. The method of claim 17, further comprising:
    receiving from the UE positioning measurements of reference signals from one or more sidelink UEs that are received and measured by the UE;
    wherein determining the position of the UE is further based on the positioning measurements of the reference signals from the one or more sidelink UEs.

21. The method of claim 20, further comprising:
    sending additional assistance data to the UE, the additional assistance data comprising position information relative to the one or more sidelink UEs.

22. The method of claim 21, wherein the additional assistance data comprises at least one of distance or angle between each sidelink UE and each base station or other sidelink UE or signal strength level measured by each sidelink UE from transmissions from each base station or other sidelink UE.

23. A method for supporting positioning of a user equipment (UE) performed by a location server, comprising:
    sending to the UE assistance data comprising relative position information between base stations, wherein the relative position information between the base stations comprises at least one of distances between the base stations, angles between the base stations, or a combination thereof, and wherein the relative position information between the base stations further comprises artificial uncertainty added to the at least one of distances between the base stations, angles between the base stations, or the combination thereof;
    receiving from the UE positioning measurements of reference signals from the base stations that are received and measured by the UE; and performing UE assisted position determination to determine a position of the UE using the positioning measurements received from the UE.

24. A location server configured for supporting positioning of a user equipment (UE), comprising:
an external interface configured to communicate with entities in a wireless network;
at least one memory; and
at least one processor coupled to the external interface and the at least one memory, wherein the at least one processor is configured to:
send to the UE assistance data comprising relative position information between base stations;
receive from the UE a subset of positioning measurements, the subset of positioning measurements being selected from a larger set of positioning measurements of reference signals from the base stations that are received and measured by the UE, wherein the subset of positioning measurements is selected by the UE based on:
calculation of relative positions of the UE using the larger set of positioning measurements and the assistance data; and
comparison of the calculated relative positions across different subsets of positioning measurements to identify and exclude one or more positioning measurements associated with an inconsistent relative position; and
perform UE assisted position determination to determine a position of the UE using the subset of positioning measurements received from the UE.

25. The location server of claim 24, wherein the relative position information between the base stations comprises at least one of distances between the base stations, angles between the base stations, or a combination thereof.

26. The location server of claim 24, wherein the comparison of the calculated relative positions across different subsets of positioning measurements is based on the relative position information between the base stations.

27. The location server of claim 24, wherein the at least one processor is further configured to:
receive from the UE positioning measurements of reference signals from one or more sidelink UEs that are received and measured by the UE;
wherein the at least one processor is configured to determine the position of the UE further based on the positioning measurements of the reference signals from the one or more sidelink UEs.

28. The location server of claim 27, wherein the at least one processor is further configured to:
send additional assistance data to the UE, the additional assistance data comprising position information relative to the one or more sidelink UEs.

29. The location server of claim 28, wherein the additional assistance data comprises at least one of distance or angle between each sidelink UE and each base station or other sidelink UE or signal strength level measured by each sidelink UE from transmissions from each base station or other sidelink UE.

30. A location server configured for supporting positioning of a user equipment (UE), comprising:
an external interface configured to communicate with entities in a wireless network;
at least one memory; and
at least one processor coupled to the external interface and the at least one memory, wherein the at least one processor is configured to:
send to the UE assistance data comprising relative position information between base stations, wherein the relative position information between the base stations comprises at least one of distances between the base stations, angles between the base stations, or a combination thereof, and wherein the relative position information between the base stations further comprises artificial uncertainty added to the at least one of distances between the base stations, angles between the base stations, or the combination thereof;
receive from the UE positioning measurements of reference signals from the base stations that are received and measured by the UE; and
perform UE assisted position determination to determine a position of the UE using the positioning measurements received from the UE.

31. A location server configured for supporting positioning of a user equipment (UE), comprising:
means for sending to the UE assistance data comprising relative position information between base stations;
means for receiving from the UE a subset of positioning measurements, the subset of positioning measurements being selected from a larger set of positioning measurements of reference signals from the base stations that are received and measured by the UE, wherein the subset of positioning measurements is selected by the UE based on:
calculation of relative positions of the UE using the larger set of positioning measurements and the assistance data; and
comparison of the calculated relative positions across different subsets of positioning measurements to identify and exclude one or more positioning measurements associated with an inconsistent relative position; and
means for performing UE assisted position determination to determine a position of the UE using the subset of positioning measurements received from the UE.

32. The location server of claim 31, wherein the comparison of the calculated relative positions across different subsets of positioning measurements is based on the relative position information between the base stations.

* * * * *